United States Patent
Lee et al.

(10) Patent No.: US 8,861,526 B2
(45) Date of Patent: *Oct. 14, 2014

(54) METHOD FOR TRANSMITTING BROADCAST SERVICE, METHOD FOR RECEIVING THE BROADCASTING SERVICE, AND APPARATUS FOR RECEIVING THE BROADCASTING SERVICE

(75) Inventors: Joonhui Lee, Seoul (KR); Kwansuk Kim, Seoul (KR); Sanghyun Kim, Seoul (KR); Dongwan Seo, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 151 days.

This patent is subject to a terminal disclaimer.

(21) Appl. No.: 13/336,910

(22) Filed: Dec. 23, 2011
(Under 37 CFR 1.47)

(65) Prior Publication Data
US 2012/0189010 A1    Jul. 26, 2012

Related U.S. Application Data

(60) Provisional application No. 61/427,198, filed on Dec. 26, 2010.

(51) Int. Cl.
*H04L 12/28* (2006.01)
*H04L 29/06* (2006.01)
*H04H 20/18* (2008.01)
*H04H 60/40* (2008.01)
*H04L 29/08* (2006.01)

(52) U.S. Cl.
CPC ........... *H04L 65/4076* (2013.01); *H04H 20/18* (2013.01); *H04H 60/40* (2013.01); *H04L 65/4023* (2013.01); *H04L 67/06* (2013.01)

USPC ......................................................... 370/392

(58) Field of Classification Search
CPC ..... H04L 29/0653; H04L 12/18; H04L 12/56; H04W 4/06
USPC ......... 370/390, 393, 394, 392, 474, 469, 389, 370/312, 412, 236; 725/116, 110; 709/219
See application file for complete search history.

(56) References Cited

U.S. PATENT DOCUMENTS

| | | | |
|---|---|---|---|
| 8,595,783 B2* | 11/2013 | Dewa | 725/116 |
| 2005/0015796 A1 | 1/2005 | Bruckner et al. | |
| 2005/0210526 A1 | 9/2005 | Levy et al. | |
| 2009/0228928 A1 | 9/2009 | Lee et al. | |
| 2010/0134701 A1 | 6/2010 | Eyer | |

FOREIGN PATENT DOCUMENTS

| | | |
|---|---|---|
| JP | 2002-344399 A | 11/2002 |
| JP | 2006-311120 | 9/2006 |
| KR | 10-2009-0127826 A | 12/2009 |
| WO | 02/17642 A2 | 2/2002 |
| WO | 2004/004360 A1 | 1/2004 |

* cited by examiner

*Primary Examiner* — Chi H Pham
*Assistant Examiner* — Alexander O Boakye
(74) *Attorney, Agent, or Firm* — McKenna Long & Aldridge LLP

(57) ABSTRACT

Provided is a method for receiving a broadcast service. The method includes: receiving a first packetized stream; extracting presentation time information from a header of the first packetized stream; extracting trigger information comprising a target service identifier and a trigger action from a payload of the first packetized stream; and performing the trigger action to an object corresponding to the target service identifier at a time indicated by presentation time information.

15 Claims, 38 Drawing Sheets

Fig.5

| Syntax | No. of Bits | Format |
|---|---|---|
| virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for)i=0;i<N;i++){ | | |
|       descriptor() | | |
|     } | | |
|   } | | |
|   reserved | 6 | '111111' |
|   additional_descriptors_length | 10 | uimsbf |
|   for(j=0;j<N;j++){ | | |
|     additional_descriptor() | | |
|   } | | |
|   CRC_32 | 32 | rpchof |
| } | | |

Fig.6

| service_type | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standard s. |
| 0x04 | ATSC_data_only_service - The virtual channel carries a data service conforming to ATSC standards, but no video of stream_type 0x02 or audio of stream_type 0x81. |
| 0x05-0x3F | [Reserved for future ATSC use] |

Fig.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

Fig.8

| Syntax | No. of bits | Format |
|---|---|---|
| data_service_table_section() { | | |
|     table_id | 8 | 0xCF |
|     section_syntax_indicator | 1 | bslbf |
|     private_indicator | 1 | bslbf |
|     reserved | 2 | '11' |
|     private_section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     data_service_table_bytes() | | |
|     CRC_32 | 32 | rpchof |
| } | | |

| Syntax | No. of bits | Format |
|---|---|---|
| data_service_table_bytes() { | | |
|     sdf_protocol_version | 8 | uimsbf |
|     application_count_in_section | 8 | uimsbf |
|     if( application_count_in_section > 0) { | | |
|       for(j = 0; j <application_count_in_section; j++) { | | |
|         compatibility_descriptor() | | |
|         app_id_byte_length | 16 | uimsbf |
|         if(app_id_byte_length > 1) { | | |
|           app_id_description | 16 | uimsbf |
|           for(i=0;i< app_id_byte_length-2;i++) { | | |
|             app_id_byte | 8 | bslbf |
|           } | | |
|         } | | |
|         tap_count | 8 | uimsbf |
|         for( i = 0; i < tap_count; i++) { | | |
|           protocol_encapsulation | 8 | uimsbf |
|           action_type | 7 | uimsbf |
|           resource_location | 1 | bslbf |
|           Tap() | | |
|           tap_info_length | 16 | uimsbf |
|           for( k=0; k<N; k++) { | | |
|             descriptor() | | |
|           } | | |
|         } | | |
|         app_info_length | 16 | uimsbf |
|         for( i=0; i< M; i++) { | | |
|           descriptor() | | |
|         } | | |
|         app_data_length | 16 | uimsbf |
|         for( i = 0; i < app_data_length; i++) { | | |
|           app_data_byte | 8 | bslbf |
|         } | | |
|       } | | |
|     } | | |
|     service_info_length | 16 | uimsbf |
|     for(j=0; j<K;j++) { | | |
|       descriptor() | | |
|     } | | |
|     service_private_data_length | 16 | uimsbf |
|     for( j = 0; j < service_private_data_length; j++) { | | |
|       service_private_data_byte | 8 | bslbf |
|     } | | |
| } | | |

Fig.12

| Syntax | No. of Bits | Format |
|---|---|---|
| NRT_service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   reserved | 4 | '1111' |
|   carrier_frequency | 32 | uimsbf |
|   channel_TSID | 16 | uimsbf |
|   program_number | 16 | uimsbf |
|   source_id | 16 | uimsbf |
|   num_NRT_services | 8 | uimsbf |
|   for (i=0; i<num_NRT_services; i++) | | |
|   { | | |
|     reserved | 4 | '1111' |
|     NRT_service_status | 2 | uimsbf |
|     SP_indicator | 1 | bslbf |
|     CP_indicator | 1 | bslbf |
|     NRT_service_id | 16 | uimsbf |
|     short_NRT_service_name | 8*8 | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0; j<num_components; j++) | | |
|     { | | |
|       reserved | 1 | '1' |
|       essential_component_indicator | 1 | bsblf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_access | 32 or 128 | uimsbf |
|       Reserved | 4 | '1111' |

Fig.13

| Syntax | No. of Bits | Format |
|---|---|---|
|        num_component_level_descriptors | 4 | uimsbf |
|      for (k=0; k<num_component_level_descriptors; k++) | | |
|      { | | |
|         component_level_descriptor() | var | |
|      } | | |
|    } | | |
|    reserved | 4 | '1111' |
|    num_NRT_service_level_descriptors | 4 | uimsbf |
|    for (m=0; m<num_MH_service_level_descriptors; m++) | | |
|    { | | |
|      NRT_service_level_descriptor() | var | |
|    } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|    virtual_channel_level_descriptor() | var | |
| } | | |
| } | | |

Fig.14

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

Fig.15

| Syntax | No. of Bits | Format |
|---|---|---|
| NRT_component_ data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1'){ | | |
|       tias_bandwidth | 16 | uimsbf |
|    } | | |
|    if (as_bandwidth_indicator == '1'){ | | |
|       as_bandwidth | 16 | uimsbf |
|    } | | |
|    if (FEC_OTI_indicator == '1'){ | | |
|       FEC_encoding_id | 8 | uimsbf |
|       FEC_instance_id | 16 | uimsbf |
|    } | | |
| } | | |

Fig.16

| Syntax | No.of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |
|     if(content_length_included=1) { | 40 | uimsbf |
|       content_length | | |
|     } | | |
|     if(playback_delay_included=1) { | | |
|       reserved | 4 | '1111' |
|       playback_delay | 20 | uimsbf |
|     } | | |
|     if(expiration_included=1) { | | |
|       expiration | | |
|     } | 32 | uimsbf |
|     content_name_lingth | | |
|     content_name_text() | 8 | uimsbf |
|     reserved | var | |
|     content_descriptors_length | 4 | '1111' |
|     for(i=-;i<N; i++) { | 12 | uimsbf |
|       content_descriptor() | | |
|     } | | |
|   } | | |
|   reserved | 6 | '111111' |
|   descriptors_length | 10 | uimsbf |
|   for(i=0; i<M; i++) { | | |
|     descriptor() | | |
|   } | | |
| } | | |

Fig.17

| Syntax | No. of bits | Format |
|---|---|---|
| NRT_content_table_section ( ) { | | |
| table_id | 8 | uimsbf |
| section_syntax_indicator | 1 | '1' |
| private_indicator | 1 | '1' |
| reserved | 2 | bslbf |
| section_length | 12 | uimsbf |
| NRT_Channel_ID | 16 | uimsbf |
| reserved | 2 | bslbf |
| version_number | 5 | uimsbf |
| current_next_indicator | 1 | 1 |
| section_number | 8 | uimsbf |
| last_section_number | 8 | uimsbf |
| protocol_version | 8 | uimsbf |
| num_contents_in_section | 8 | uimsbf |
| for (j=0; j < num_contents_in_section; j++) { | | |
| content_version | 32 | uimsbf |
| content_id | 32 | uimsbf |
| content_available_start_time | 32 | uimsbf |
| content_available_end_time | 32 | uimsbf |
| ETM_location | 2 | uimsbf |
| content_length_in_seconds | 30 | uimsbf |
| content_size | 48 | uimsbf |
| content_delivery_bit_rate | 32 | uimsbf |
| content_title_length | 8 | uimsbf |
| content_title_text ( ) | var | |
| descriptors_length | 16 | uimsbf |
| for (i=0; i < N; i++) { | | |
| descriptor ( ) | | |
| } | | |
| } | | |
| } | | |

Fig. 18

| Syntax | No.of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) | | |
|       source_IP_address | 32 or 128 | uimsbf |
|     if (service_destination_IP_address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) | | |
|     { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

Fig.19

```
<?xml version="1.0" encoding="UTF-8"?>
<xs:schema xmlns="urn:atsc:nrt:flute:fdt:2009" xmlns:xs='http://www.w3.org/2001/XMLSchema"
targetNamespace="urn:atsc:nrt:flute:fdt:2009' elementFormDefault ="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs ="unbounded"/>
      <xs:element name="FDT-Content-ID" type="xs:usigredShort" minOccurs='0" maxOccurs="unbounded"/> ①
      <xs:anynamespace="##other" processContents="skip" minOccurs='0"maxOccurs ="unbounded"/>
    </xs:sequence>
    <xs:attribute name="Expires" type="xs:string' use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attributename="FEC-OTI-Max-Number-of-Encoding-Symbols" type="-xs:unsignedLong" use="optional"/>
    <xs:attribute name="FEC-OTI-Scheme-Specific-Info" type="xs:base64Binary" use="optional"/>
    <xs:anyAttribute processContents='skip"/>
  </xs:complexType>
<xs:complexType name="File-Type">
  <xs:sequence >
    <xs:element name="File-Content-ID" type="Content-ID-Type" minOccurs="0" maxOccurs ='unbounded"/> ②
    <xs:any namespace="##other"processContents="skip"minOccurs ="0'maxOccurs ="unbounded"/>
  </xs:sequence >
  <xs:attribute name="Content-Location" type="xs:anyURI" use="required"/>
  <xs:attribute name="TOI' type='xs:positiveInteger' use="required"/>
  <xs:attribute name="Content-Length" type="xs:unsignedLong" use='required"/>
  <xs:attribute name="Transfer-Length" type='xs:unsignedLong" use="optional"/>
  <xs:attribute name="Content-Type" type="xs:string' use="optional"/>
  <xs:attribute name="Content-Encoding" type="xs:string" use="optional"/>
  <xs:attribute name="Content-MD5" type="xs:base64Binary" use="optional"/>
  <xs:attribute name="FEC-OTI-FEC-Encoding-ID" type="xs:unsignedLong" use="optional"/>
  <xs:attribute name="FEC-OTI-FEC-Instance-ID" type="xs:unsignedLong" use="optional"/>
  <xs:attribute name="FEC-OTI-Maximum-Source-Block-Length" type="xs:unsignedLong" use="optional"/>
  <xs:attribute name="FEC-OTI-Encoding-Symbol-Length" type='xs:unsignedLong" use="optional"/>
  <xs:attribute name="FEC-OTI-Max-Number-of-Encoding-Symbols" type="xs:unsignedLong' use="optional"/>
  <xs:attribute name="FEC-OTI-Scheme-Specific-Info" type="xs:base64Binary" use='optional"/>
  <xs:anyAttribute processContents ="skip"/>
</xs:complexType >
<xs:complexType name="Content-ID-Type">
  <xs:attribute name='Content-ID' type='xs:unsingedShort' use="required"/>
  <xs:attribute name='entry" type="xs:boolean ' default="false" use="optional'/> ③
  <xs:anyAttribute processContents='skip"/>
</xs:complexType >
</xs:schema >
```

Fig. 20

```
<?xml version='1.0' encoding="UTF-8"?>
<xs:schema xmlns='urn:atsc:nrt:flute:fdt:2009' xmlns:xs="http://www.w3.org/2001/XMLSchema'
targetNamespace='urn:atsc:nrt:flute:fdt:2009" elementFormDefault='qualified'>
  <xs:element name="FDT-Instance" type='FDT-InstanceType"/>
  <xs:complexType name="FDT-InstanceType" >
    <xs:sequence >
      <xs:element name="File" type="File-Type'maxOccurs ='unbounded'/>
      <xs:element name="FDT-Content-ID" type='FDT-Content-ID-Type" minOccurs="0" maxOccurs="unbounded"/>
      <xs:any namespace="##other" processContents ="skip'minOccurs="0"maxOccurs="unbounded"/>
    </xs:sequence>                                                                                    ①
    <xs:attribute name='Expires' type="xs:string" use="required"/>
    <xs:attribute name='Complete" type='xs:boolean' use="optional"/>
    <xs:attribute name='Content-Type' type='xs:string" use="optional"/>
    <xs:attribute name='Content-Encoding" type="xs:string" use='optional"/>
    <xs:attribute name='FEC-OTI-FEC-Encoding-ID" type="xs:unsignedLong" use="optional'/>
    <xs:attribute name='FEC-OTI-FEC-Instance-ID" type='xs:unsignedLong" use="optional'/>
    <xs:attribute name='FEC-OTI-Maximum-Source-Block-Length" type=" xs:unsignedLong" use="ootional"/>
    <xs:attribute name='FEC-OTI-Encoding-Symbol-Length' type='xs:unsignedLong' use="optional"/>
    <xs:attribute name='FEC-OTI-Max-Number-of-Encoding-Symbols" type='xs:unsignedLong" use="opticnal"/>
    <xs:attribute name='FEC-OTI-Scheme-Specific-Info" type="xs:base64Binary" use='optional'/>
    <xs:anyAttribute processContents ="skip"/>
  </xs:complexType>
<xs:complexType name="File-Type">
    <xs:sequence>
      <xs:element name="File-Content-ID" type="Content-ID-Type" minOccurs='0'maxOccurs ="unbounded"/>
      <xs:any namespace="##other"processContents="skip'minOccurs="0' maxOccurs="unbounded'/>
    </xs:sequence >
    <xs:attribute name='Content-Location" type="xs:anyURI" use="required"/>
    <xs:attribute name='TOI' type="xs:positiveInteger" use='required'/>
    <xs:attribute name='Content- Length" type="xs:unsignedLong" use="required"/>
    <xs:attribute name='Transfer-Length" type=' xs:unsignedLong" use="optional"/>
    <xs:attribute name='Content- Type' type='xs:string" use="optional"/>
    <xs:attribute name='Content- Encoding" type="xs:string ' use="optional"/>
    <xs:attribute name='Content- MD5" type='xs:base64Binary' use='optional'/>
    <xs:attribute name='FEC-OTI-FEC-Encoding-ID" type=" xs:unsignedLong" use='optional'/>
    <xs:attribute name='FEC-OTI-FEC-Instance-ID" type="xs:unsignedLong" use='optional'/>
    <xs:attribute name='FEC-OTI-Maximum-Source-Block-Length' type="xs:unsignedLong" use='optional'/>
    <xs:attribute name='FEC-OTI-Encoding-Symbol-Length" type='xs:unsignedLong" use='optional'/>
    <xs:attribute name='FEC-OTI-Max-Number-of-Encoding-Symbols" type=' xs:unsignedLong" use="optional'/>
    <xs:attribute name='FEC-OTI-Scheme-Specific-Info' type="xs:base64Binary" use="optional"/>
    <xs:anyAttribute processContents ="skip'/>
  </xs:complexType >
<xs:complexType name="FDT-Content-ID-Type'>  ②
    <xs:sequence>
      <xs:element name='Entry-Content-Location' type=xs:anyURI 'minOccurs='0' maxOccurs='unbounded"/>
    </xs:sequence>
    <xs:attribute name="Content-ID" type="xs:unsingedShort" use="required"/>
    <xs:anyAttribute processContents="skip"/>
  <xs:complexType>
<xs:complexType name='Content-ID-Type'>
    <xs:attribute name='Content-ID" type="xs:unsingedShort" use="required"/>
    <xs:attribute name='entry" type="xs:boolean" default="false" use="optional"/>
    <xs:anyAttribute processContents ="skip"/>
  </xs:complexType >
</xs:schema >
```

Fig.25

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor () | var | |
|         } | | |
|     } | | |
| } | | |

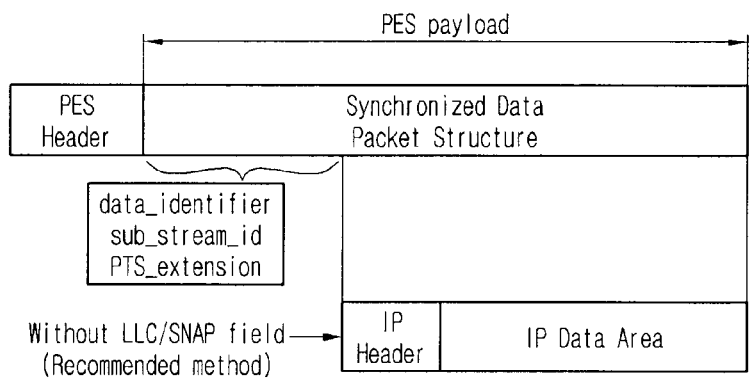

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

Fig. 28

| Syntax | No. of bits | Format |
|---|---|---|
| contentTypeDescriptor(){ | | |
| descriptorTag | 8 | 0x72 |
| descriptorLength | 8 | uimsbf |
| for(i=0; i<descriptorLength; i++){ | | |
| contentTypeByte | 8 | bslbf |
| } | | |
| } | | |

Fig.29

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|    descriptor() | |
| } | |
| for(i=0;i<N1;i++){ | |
|    steam_type | 8 |
|    reserved | 3 |
|    elementary_PID | 13 |
|    reserved | 4 |
|    ES_info_length | 12 |
|    for(i=0;i<N2;i++){ | |
|      descriptor() | |
|    } | |
| } | |
| CRC_32 | 32 |
| } | |

| Syntax | No. of Bits | Format |
|---|---|---|
| service_id_descriptor() { | | |
|    descriptor_tag | 8 | 0xC2 |
|    descriptor_length | 8 | uimsbf |
|    service_count | 8 | uimsbf |
|    for (i=0; i<service_count; i++) | | |
|      service_id | 16 | bslbf |
|    for (j=0; j< N; j++) { | | |
|      reserved | 8 | bslbf |
|    } | | |
| } | | |

Fig.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
|     descriptor() | |
| } | |
| for(i=0;i<N1;i++){ | |
|     steam_type | 8 |
|     reserved | 3 |
|     elementary_PID | 13 |
|     reserved | 4 |
|     ES_info_length | 12 |
|     for(i=0;i<N2;i++){ | |
|         descriptor() | |
|     } | |
| } | |
| CRC_32 | 32 |
| } | |

| Syntax | No. of Bits | Format |
|---|---|---|
| Trigger_stream_descriptor() { | | |
|     descriptor_tag | 8 | 0xC2 |
|     descriptor_length | 8 | uimsbf |
|     target_service_count | 8 | uimsbf |
|     for (i=0; i<service_count; i++) { | | |
|         target_service_id | 16 | bslbf |
|         target_content_item_count | 8 | uimsbf |
|         for(k=0; k<target_content_item_count; k++) { | | |
|             target_content_linkage | 32 | bslbf |
|     } | | |
|     for (j=0; j< N; j++) { | | |
|         reserved | 8 | bslbf |
|     } | | |
| } | | |

Fig.31

| | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|         descriptor() | | |
|     } | | |
|     reserved_future_use | 4 | bslbf |
|     application_loop_length | 12 | uimsbf |
|     for(i=0;i<N;i++){ | | |
|         application_identifier() | | |
|         application_control_code | 8 | uimsbf |
|         reserved_future_use | 4 | bslbf |
|         application_descriptors_loop_length | 12 | uimsbf |
|         for(j=0;j<N;j++){ | | |
|             descriptor() | | |
|         } | | |
|     } | | |
|     CRC_32 | 32 | rpchof |
| } | | |

Fig.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|         descriptor() | | |
|     } | | |
|     CRC_32 | 32 | rpchof |
| } | | |

METHOD FOR TRANSMITTING BROADCAST SERVICE, METHOD FOR RECEIVING THE BROADCASTING SERVICE, AND APPARATUS FOR RECEIVING THE BROADCASTING SERVICE

CROSS-REFERENCE TO RELATED APPLICATIONS

The present application claims priority under 35 U.S.C. 119 and 35 U.S.C. 365 to U.S. Patent Application No. 61/427,198 (filed on 26 Dec. 2010), which is hereby incorporated by reference in its entirety.

BACKGROUND

The present disclosure relates to a method for transmitting a broadcasting service, a method for receiving the broadcasting service, and an apparatus for receiving the broadcasting service.

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately is increased.

SUMMARY

Embodiments provide a method for receiving and processing a non-real time service and a method for transmitting the non-real time service.

Embodiments also provide a method for linking a content downloaded through a non-real time service with a broadcasting service, and a receiving device thereof.

Embodiments also provide a transmission method for linking a non-real time service with a real-time broadcasting service without interfering with a typical receiver, and a receiving device thereof.

In one embodiment, a method for receiving a broadcast service includes: receiving a first packetized stream; extracting presentation time information from a header of the first packetized stream; extracting trigger information comprising a target service identifier and a trigger action from a payload of the first packetized stream; and performing the trigger action to an object corresponding to the target service identifier at a time indicated by presentation time information.

In another embodiment, a method for transmitting a broadcast service includes: setting a trigger action and a trigger time for a target service to be triggered; inserting presentation time information corresponding into the trigger time in a header of a first packetized stream; inserting trigger information including identifier of the target service and the trigger action in a payload of the first packetized stream; and transmitting the first packetized stream.

In further another embodiment, an apparatus for receiving a broadcast service includes: a receiving unit configured to receive a first packetized stream; a trigger processing unit configured to extract presentation time information from a header of the first packetized stream and to extract trigger information comprising target service identifier and trigger action from a payload of the first packetized stream; and a service manager configured to perform the trigger action to an object corresponding to the target service identifier at a time indicated by presentation time information.

The details of one or more embodiments are set forth in the accompanying drawings and the description below. Other features will be apparent from the description and drawings, and from the claims.

BRIEF DESCRIPTION OF THE DRAWINGS

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section) for identifying an application of NRT service and bit stream syntax of data_service_table_bytes in a DST section.

FIGS. 12 and 13 are views illustrating a bit stream syntax of NST according to an embodiment.

FIG. 14 is a view illustrating a bit stream syntax of NRT_component_descriptor (MH_component_descriptor) according to an embodiment.

FIG. 15 is a view illustrating a bit stream syntax of NRT component descriptor including NRT_component_data according to an embodiment.

FIG. 16 is a view illustrating a bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 26 is a view illustrating a PES structure according to a synchronized data stream method including a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment FIG. 29 is a view illustrating a syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

DETAILED DESCRIPTION OF THE EMBODIMENTS

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be stored in a storage medium of the broadcast receiver, and then may be displayed on a display device according to a predetermined time or at the user's request. The NRT service is received in a file format, and is stored in a storage medium according an embodiment. The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, store them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
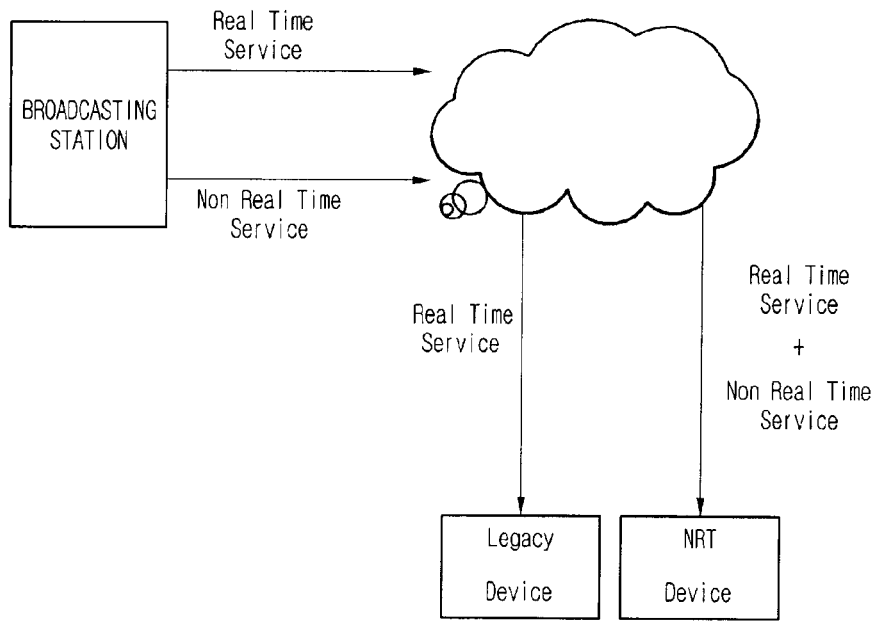
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and store the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
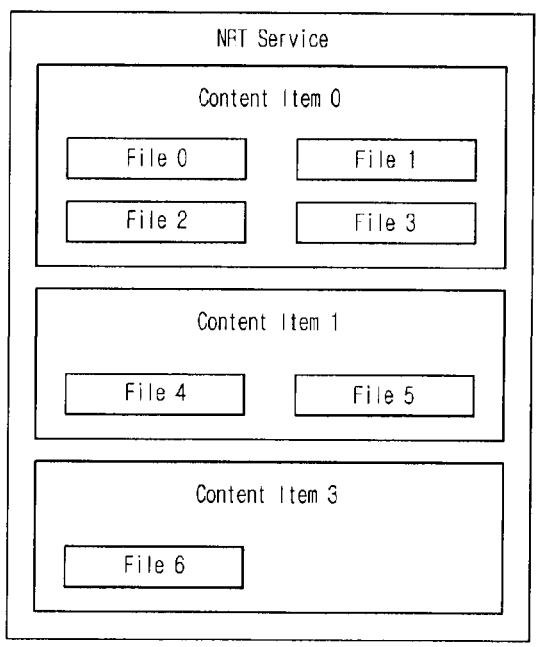
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted. According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT (or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be stored in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IANA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

Figure 3:
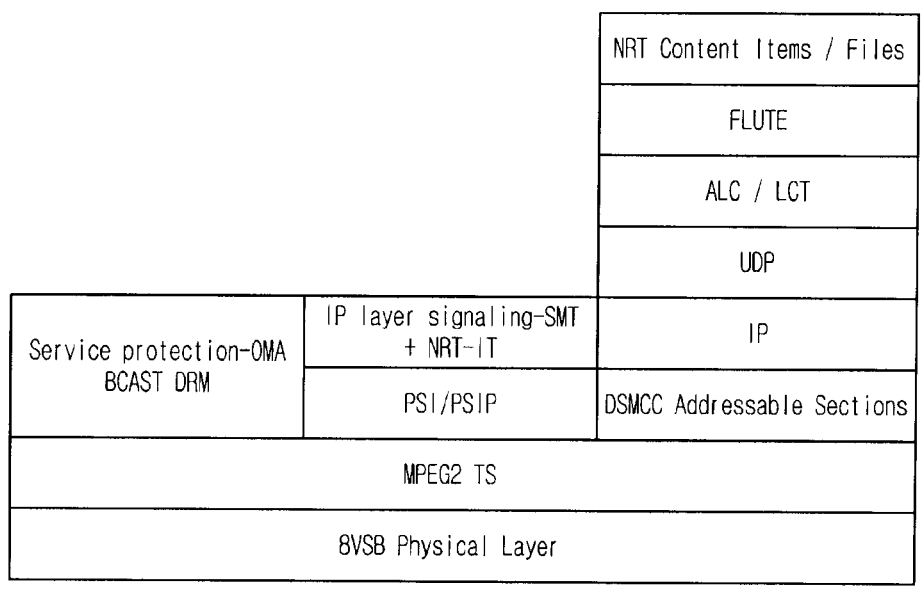
FIG. 3 is a view illustrating a protocol stack for NRT service according to an embodiment.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MPEG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT). The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MPEG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Figure 4:
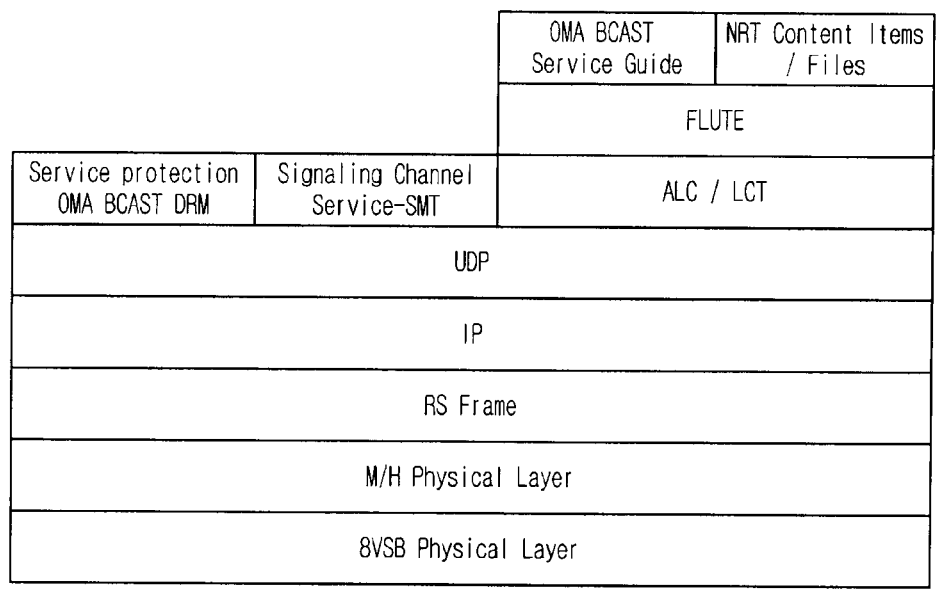
FIG. 4 is view illustrating one example of the protocol stack for mobile NRT service.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At the time, the service signaling channel is encapsulated in the IP datagram including Well-known IP destination address and well-known destination UDP port number, and is multi-casted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

First, the header part will be described as follows.

A table_id field (8 bits) is set with 0xC8 and identifies that a corresponding table section is a table section constituting TVCT.

A section_syntax_indicator field (1 bit) is set with 1 and represents that the section follows a general section syntax.

A private_indicator field (1 bit) is set with 1.

A section_length field (12 bits) describes that the number of bits remaining in the section to the last of the section from immediately after the section_length field. The value of the section_length field may not be greater than 1021.

A table_id_extension field (16 bits) may be set with 0x000.

A version_number field (5 bits) may have 0 and means the version number of VCT.

A current_next_indicator field (1 bit) represents that a corresponding table section is applicable currently if set with 1.

A section_number field (8 bits) indicates the number of corresponding table section among TVCT sections. In a first section of TVCT, section_number should be set with 0x00.

A last_section_number field (8 bits) means the table section of the last and highest number among TVCT sections.

A protocol_version field (8 bits) is a function that allows a table type delivering parameters having a different structure than one defined in a current protocol. Today, only one valid value of protocol_version is 0. The protocol_version having other than 0 may be used for the future version of the standard in order to recognize another table having a different structure.

Next, the body part will be described.

A num_channels_in_section field (8 bits) designates the numbers of virtual channels in the VCT section. The numbers are restricted by a table section length.

A short_name field (16 bits) represents the name of the virtual channel using 16 bit code value from 1 to 7 sequentially.

A major_channel_number field (10 bits) represents a major channel number related to a virtual channel defined by repetition in a "for" loop. Each virtual channel should relate to a major channel number and a minor channel number. The major channel number together with the minor channel number serve as a reference number of a virtual channel of a user.

A minor_channel_number field (10 bits) represent minor or sub channel numbers ranging from '0' to '999'. This field together with major_channel_number serves as the second of the number or a channel number of second part representing the right portion. The minor_channel number is set with 0 if service_type is an analog television. When the service_type is an ATSC_digital_television or an ATSC_audio_only, it uses a minor number ranging from 1 to 99. A value of the minor_channel_number does not overlap that of the major_channel_number in a TVCT.

A modulation_mode field (8 bits) represents a modulation mode for carrier related to a virtual channel.

A carrier_frequency field (32 bits) has a recommendation value of 0. Although the field is used to identify a carrier frequency, it is not recommended.

A channel_TSID field (16 bits) is an unsigned integer field representing an MPEG-2 TS ID related to a TS containing an MPEG-2 program, which is reference by a virtual channel in a range from '0x0000' to '0xFFFF'.

A program_number field (16 bits) identifies an unsigned integer number related to a virtual channel defined in an MPEG-2 program association table (PAT) and a TS program map table (PMT). A virtual channel corresponding to analog service includes program_number of '0xFFFF'.

An ETM_location field (2 bits) describes the existence and location of an extended text message (ETM).

An access_controlled field (1 bit) indicates an access to events related to a virtual channel is controlled once it is set. If the flag is set with 0, an event access is not restricted.

A hidden field (1 bit) indicates that a user by a direct entry of a virtual channel number cannot access a virtual channel once it is set. A hidden virtual channel is omitted when a user surfs a channel, and is shown when the user accesses undefined or direct channel entry. A typical application of a hidden channel is a test signal and NVOD service. The hidden channel and its events may be shown on an EPG display according to a state of a hide_guide bit.

A hidden_guide field allows a virtual channel and its events to be displayed on an EPG display once it is set with 0 for a hidden channel. The bit is not related to a channel having no hidden bit set and thus non-hidden channels and their events are always displayed on an EPG display regardless of a state of a hide_guide bit. A typical application of a hidden channel, in which a hidden_guide bit set is set with 1, is a test signal and service easily obtainable through an application level pointer.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

A source_id field (16 bits) represents the source of a program related to a virtual channel.

A descriptors_length field represents the total length (byte unit) of a descriptor for the following virtual channel.

A descriptor( ) field includes at least zero descriptor.

An additional_descriptors_length field represents a total length (byte unit) of the following VCT descriptor.

Lastly, in relation to the trailer part, a CRC_32 field is a 32 bit field and includes a cyclic redundancy check (CRC) value, which ensures zero output from registers of a decoder defined in an MPEG-2 system after processing an entire STT section.

FIG. 8 is view of data_service_table_section) for identifying an application of NRT service and bit stream syntax of data_service_table_bytes in a DST section. A broadcasting station NRT service data or NRT service signaling data, satisfying ASIC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is 0XCF.

A section_syntax_indicator field (1 bit) is an indicator defining a section format of DST, and the section format may be short-form syntax (0) of MPEG, for example.

A private_indicator field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application count in section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
|---|---|
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addresssble Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0xFF | User defined |

An action_type field (7 bits) represents attribute of data referenced by a Tap( ).

A resource_location field (1 bit) describes a position of an association_tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
|---|---|---|
| Tap ( ){ | | |
| tap_id | 16 | uimsbf |
| use | 16 | uimsbf |
| association_tag selector( ) } | 16 | uimsbf |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association_tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
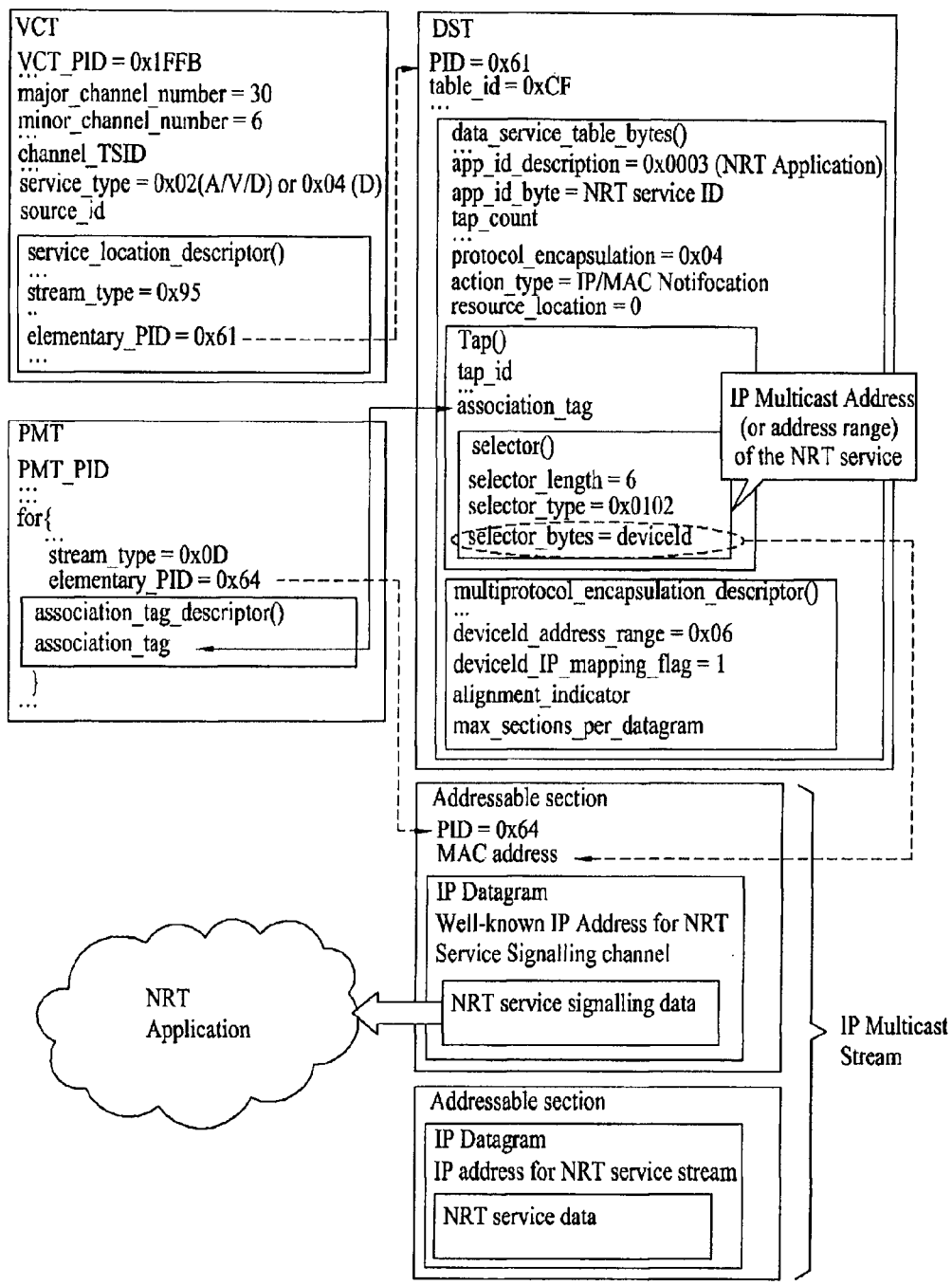
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02 (i.e., digital A/V/Data), 0x04 (i.e., Data only), or 0x08 (i.e., NRT Only service), NRT service stream may be transmitted to the virtual channel. At this point, if 0x95 (i.e., DST transmission) is allocated to a stream_type field value in a service location descriptor (or ES loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_description field of DST defines the format and interpretation of the following application identification bytes. According to an embodiment, '0x0003' is allocated to the App_id_description field to identify NRT application. The above numerical value is just one example, and does not restrict the range of the rights of the present invention.

If the App_id_description field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

Then, the receiver receives NRT service data, i.e., NRT content item/files to store them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
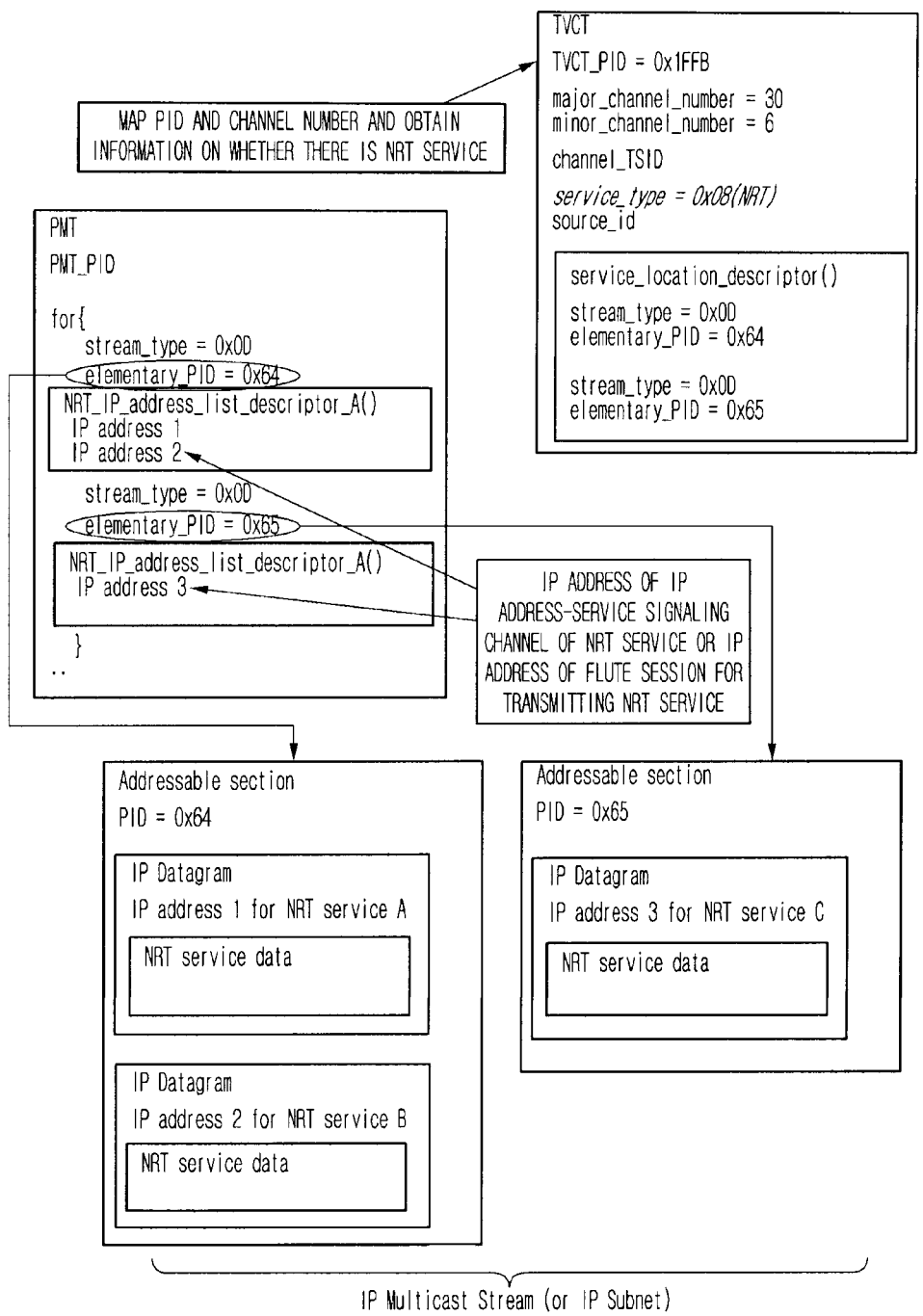
FIGS. 10 and 11 are views illustrating a method of signaling a DSM-CC addressable section data by using VCT according to another embodiment.
Figure 11:
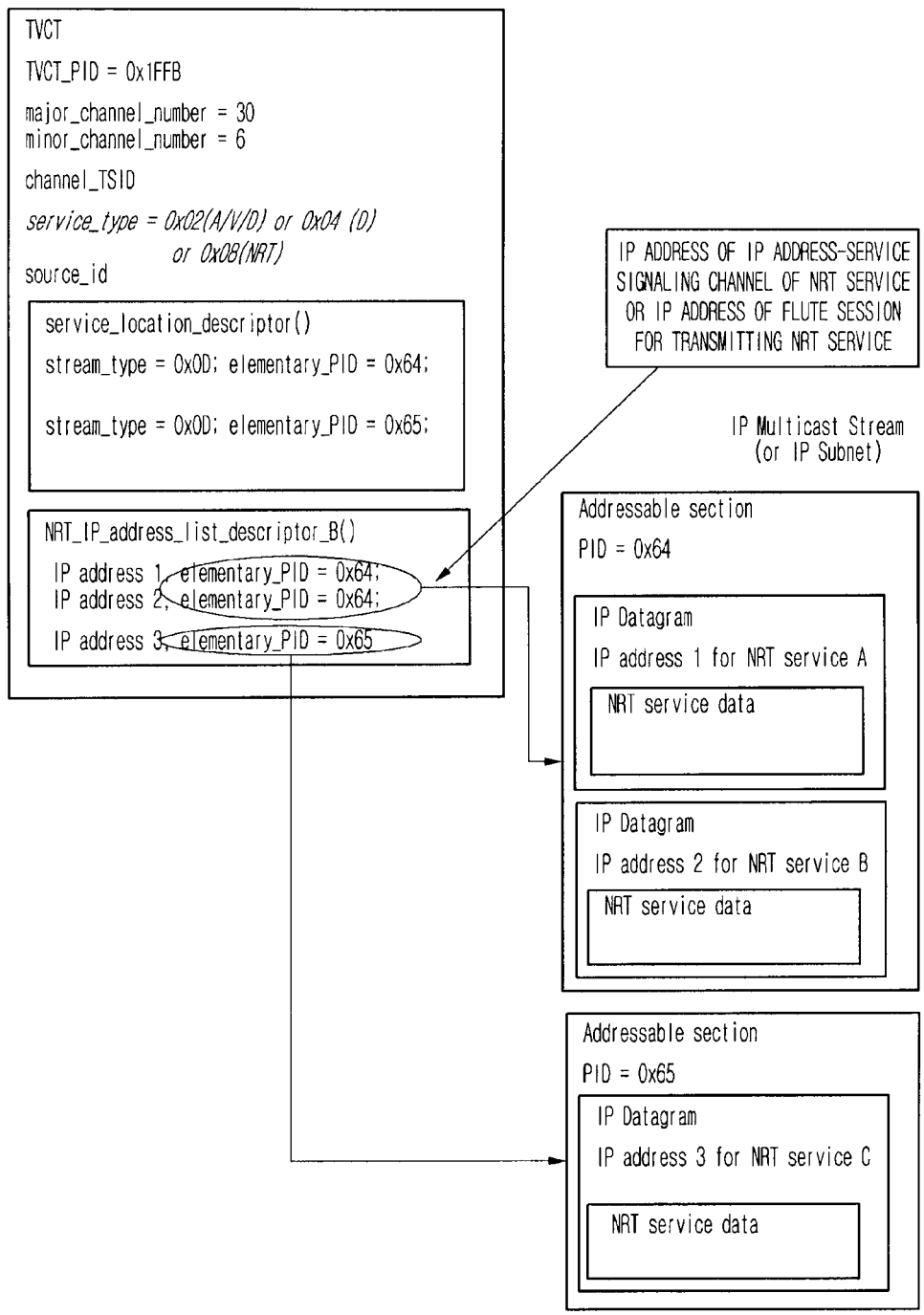

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0X02, 0X04 of 0X08. Also, the receiver may obtain elementary_PID having a stream type of 0X0D from the service_location_descriptor( ) field to receive the DSM-CC stream. Here, the receiver may obtain an NRT_IP_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_description field value.

According to an embodiment, '0x0003' is allocated to the App_id_description field to identify NRT application. The above numerical value is just one example, and does not restrict the range of the rights of the present invention.

If the App_id_description field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to store them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-2 private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A table_id field (8 bits) as a field for type identification of a corresponding table section is a table section in which a corresponding table section constitutes NST through this field.

A section_syntax_indicator field (1 bit) is an indicator defining a section format of NST, and the section format may be short-form syntax (0) of MPEG, for example.

A private_indicator field (1 bit) represents whether the format of a corresponding section follows a private section format and may be set with 1.

A section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields. Here, a table_id_extension field includes an NST_protocol_version field.

The NST_protocol_version field (8 bits) shows a protocol version for notifying that NST transmits parameters having a different structure than other defined in a current protocol. Currently, this field value is 0. If the field value is designated with other than 0 later, it is for a table having a different structure.

A version_number field (5 bits) represents the version number of NST.

A current_next_indicator field (1 bit) indicates whether a transmitted NST table section is applicable currently. If the field value is 0, it means that there is no table yet and the next table is valid.

A section_number field (8 bits) represents a section number in sections in which a corresponding table section constitutes a NST table.

section_number of the first section of an NRT Service Table (NST) is set with '0x00'. The section_number is increased by one each time a section of the NST is increased.

A last_section_number field (8 bits) represents the last section number constituting a NST table, i.e., the highest section_number. (Highest section_number)

A carrier_frequency field (32 bits) notifies a transmission frequency corresponding to a channel.

A channel_TSID field (16 bits) means a unique channel identifier of broadcast stream in which a corresponding NST section is currently transmitted.

A program_number field (16 bits) represents the number of a program related to a virtual channel.

A source_id field (16 bits) represents the source of a program related to a virtual channel.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_status field (2 bits) identifies a state of a corresponding mobile service. Here, MSB indicates whether a corresponding mobile service is active (1) or inactive (0), and whether the corresponding mobile service is hidden (1) or not (0). Here, if the mobile service is NRT service, a state of the corresponding NRT service is identified. Hidden service is mainly used for exclusive application and a typical receiver disregards it.

A SP_indicator field (1 bit) is a field representing service protection if the service protection applied to at least one of components necessary for providing meaningful presentation of a corresponding mobile service is set.

A CP_indicator field (1 bit) represents whether content protection of a corresponding NRT service is set. If the CP_indicator field value is 1, it means that the content protection is applied to at least one of components required to provide a meaningful presentation of a corresponding NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

A Short_NRT_service_name field (8*8 bits) displays a short name of the NRT service. If there is no short name of the NRT service, the field may be filled with a null value (for example, 0x00).

An NRT_service_category field (6 bits) identifies a type of service in the corresponding NRT service.

A num_components field (5 bits) displays the number of IP stream components in the NRT service.

If an IP_version_flag field (1 bit) is set with 0, it indicates that a source_IP_address field, an NRT_service_destination_IP_address field, and a component_destination_IP_address field are IPv4 addresses. If set with 1, a source_IP_address field, an NRT_service_destination_IP_address field, and a component_destination_IP_address field are IPv6 addresses.

A source_IP_address_flag field (1 bit) indicates when a flag is set that there is a source IP address value for corresponding NRT service to indicate source specific multicast.

An NRT_service_destination_IP_address_flag field (1 bit) indicates when a flag is set with 1 that there is an NRT_service_destination_IP_address field for providing a default IP address for components of a corresponding NRT service.

In relation to a source_IP_address field (128 bits), there is a corresponding field if source_IP_address_flag is set with 1, but there is no corresponding field if set with 0. If there is a corresponding field, the corresponding field includes a source IP address of all IP datagram transmitting components of the corresponding NRT service. A restricted use of a 128 bit long address of a corresponding field is for future use of IPv6, which is not currently used though. Source_IP_address becomes a source IP address of the same server transmitting all channels of a FLUTE session.

In relation to an NRT_service_destination_IP_address field (128 bits), if source_IP_address_flag is set with 1, there is a source_IP_address field, but if source_IP_address_flag is set with 0, there is no corresponding source_IP_address field. If there is no corresponding source_IP_address field, a component_destination_IP_address field exists for each component in a num_components loop. A restricted use of a 128 bit long address of a corresponding source_IP_address field is for future use of IPv6, which is not currently used though. NRT_service_destination_IP_Address is signaled if there is a destination IP address of a session level of the FLUTE session.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session. Firstly, the definitely necessary parameters include parameters such as a source IP address, the number of channels in the session, the destination IP address and port number for each channel in the session, the Transport Session Identifier (TSI) of the session, and the start time and end time of the session. The optional necessary parameters related to a corresponding FLUTE session include parameters such as FEC Object Transmission Information, some information that tells receiver in the first place, that the session contains files that are of interest and bandwidth specification.

The number of channels in the session may be explicitly provided, or may be obtained by adding up the number of streams constituting the session. Through the NST and component_descriptor, parameters such as start time and end time of the session, source IP address, destination IP address and port number for each channel in the session, Transport Session Identifier (TSI) of the session, and number of channels in the session may be signaled.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

Hereinafter, each field of NRT_component_data will be described as follows.

A TSI field (16 bits) represents TSI of a FLUTE session.

A session_start_time field indicates a start time of the FLUTE session. If all values of the corresponding fields are 0, it means that a session started already.

A session_end_time field indicates an end time of the FLUTE session. If all values of the corresponding fields are 0, it means that a session continues infinitely.

A tias_bandwidth_indicator field (1 bit) indicates flags including Transport Independent Application Specific (TIAS) bandwidth information. If it indicates that the TIAS bandwidth field exists, a corresponding bit is set with 1, and if it indicates that the TIAS bandwidth field does not exist, the corresponding bit is set with 0.

In relation to an as_bandwidth_indicator field (1 bit), flags include Application Specific (AS) bandwidth information. If it indicates that the AS bandwidth field exists, a corresponding bit is set with 1, and if it indicates that the AS bandwidth field does not exist, the corresponding bit is set with 0.

An FEC_OTI_indicator field (1 bit) represents whether FEC object transmission information (OTI) is provided.

A tias_bandwidth field represents a TIAS maximum bandwidth.

An as_bandwidth field has an AS maximum bandwidth value.

An FEC_encoding_id field represents FEC encoding ID used in the corresponding FLUTE session.

An FEC_instance_id field represents FEC instance ID used in the corresponding FLUTE session.

Provided is a method of providing all Information necessary for receiving the FLUTE session by signaling the same parameters as above through FLUTE component data bytes, and of receiving files by obtaining information on all the files delivered through the FLUTE session that uses FDT received through the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and stored in at least two sections.

The downloadable content item, which is more extended than a period that at least one NRT-IT instance takes, is the first of NRT-IT. The content item description is stored in NRT_information_table_section ( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A table_id field (8 bits) is set with 0xTBD to identify a table section that a corresponding table section constitutes NRT-IT.

A service_id field (16 bits) describes a service_id field related to NRT service showing a content item that the section describes.

An NRT_IT_version_number field (5 bits) is defined as a set in at least one NRT_content_table_section( ) having a common value with respect to service_id, current_next_indicator, protocol_version, and time_span_start fields. It identifies a version number of an NRT-IT instance. The version number is increased by 1 modulo 32 when a field of NRT-IT instance is changed.

A current_next_indicator field (1 bit) represents that a corresponding table section is applicable currently if set with 1.

A protocol_version field (8 bits) is set with 0. A function of protocol_version allows a table type having parameters in the future, which has a different structure than those defined in the current protocol. Currently, only one valid value of protocol_version is 0. A value other than in protocol_version is used for the future version of standard to recognize other tables having different structures.

A time_span_start field (32 bits) represents a start time of an instance period represented in GPS sec from 00:00:00 UTC, Jan. 6, 1980. A time of day of time_span_start_is set to 00 min of the time. A value 0 of time_span_start represents a period of an NRT-IT instance starting from a negative past. A value of time_span is identical at each section of multi-sectioned NRT-IT instance. Values of time_span_start and time_span_length are set not to overlap another NRT-IT instance of an IP subnet at a specified period.

A time_span_length field (11 bits) identifies a number of min starting at the time recognized at time_span_start that the instance covers. Once it is set, a value of time_span_length does not change in a value of time_span_start. If a value of time_span_length is 0, an NRT-IT instance covers an entire time starting from time_span_start at the indefinite future. When a value of time_span_start is 0, there is no meaning in time_span_length.

A value of time_span_start is identical at each section of multi-sectioned NRT-IT instance. Values of time_span_start_and time_span_length are set not to overlap another NRT-IT instance of an IP subnet at a specified period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragment in Text FragmentTable). A value of a content_linkage field corresponds to a value of an FDTCotent-Linkage element or a value of a File-Content-Linkage element in FLUTE FDT of each file related to a content item. A priority rule is applied when each content linkage value including a corresponding content linkage element in FLUTE FDT is matched.

A TF_available flag (Boolean flag) is set with 1 when Text Fragment exists in a Text Fragment Table of a service signaling channel. If Text Fragment is not included in a service signaling channel for the content item, a value of the TF_available field is set with 0.

If a low_lantency flag (Boolean flag) is set with 1, as a user waits, content is valid in a current digital transmission of sufficiently low delay time that collection attempts. If set with 0, a collection delay time becomes longer and a user interface suggests a post view to a user.

A playback_length_in_seconds (20 bits) is an integer representing a playing time of a content in sec. A content including texts and/or still images has a value of 0. In relation to a content including audio or audio/video content, playback_length_in_seconds represents a playing time of audio or audio/video content.

If a content_length_included flag (Boolean flag) is set with 1, a content_length field exists in the repetition in a 'for' loop. If set with 0, it indicates that the content_length field does not exist in the repetition in a 'for' loop.

If a playback_delay_included flag (Boolean flag) is set with 1, it indicates that a playback_delay field exists in the repetition in a 'for' loop. If set with 0, it indicates that the playback_delay field does not exist in the repetition in a 'for' loop.

If an expiration_included flag (Boolean flag) is set with 1, an expiration field exits in the repetition in a 'for' loop. If set with 0, it indicates that the expiration field does not exist in the repetition in a 'for' loop.

A duration (12 bits) field represents an expected cycle time of carousel including a referenced content item in a range of 1 to 2880 in min. A receiver uses a duration parameter determining a time taking for the referenced content capture.

playback_delay (20 bits) is represented with a number of the next sec of the first byte before playing a related content while incoming stream is buffered. A value of 0 represents playing starts immediately. When playback_delay is not set, a receiver collects a complete file or a file before playing.

An expiration field (32 bits) represents expiration time expressed in GPS sec from 00:00:00 UTC, Jan. 6, 1980. After expiration, the content is deleted from the memory. If it is not expired, the receiver uses a method that a company for managing a memory resource selects.

A content_name_length_field (8 bits) represents the length (byte unit) of content_name_text.

A content_name_text( ) field represents a content item title in a system having a plurality of string structures.

A content_descriptors_length field (12 bits) represents an entire length (byte unit) of content_descriptor providing additional information on a content level.

content_descriptor is a descriptor that is additionally applied to each content item.

descriptor_length (10 bits) represents an entire length (byte unit) of a descriptor.

A descriptor is generally applied to all content items described in the current NRT-IT section.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A section_syntax_indicator field (1 bit) is an indicator defining a section format of NCT.

A private_indicator field (1 bit) represents whether NCT follows a private section.

A section_length field (12 bits) represents the section length of NST.

An NRT_channel_id field (16 bits) represents a value uniquely identifying NRT service including content described in NCT.

A version_number field (5 bits) represents the version number of NCT.

A current_next_indicator field (1 bit) represents whether information in a corresponding NCT section is applicable currently or in the future.

A section_number field (8 bits) represents the section number of a current NCT section.

A last_section_number field (8 bits) represents the last section number of NCT.

A protocol_version field (8 bits) indicates a protocol version for allowing NCT, which transmits parameters having different structures then those defined in a current protocol. (An 8-bit unsigned integer field whose function is to allow, in the future, this NRT Content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents in the NCT. At this point, the number of contents represents the number of contents transmitted through a virtual channel that source_id specifies.

Later, a 'for' loop (or a content loop) is performed as many as the number of contents corresponding to the num_contents_in_section field value, to provide the detailed information of a corresponding content by each content.

A content_version field (32 bits) indicates the version number for content (or a file) having a specific content_id value. That is, let's assume that if content_id of a content that a receiver receives previously is 0x0010, the same content, i.e., its content_id value is 0x0010 is transmitted. At this point, if the content_version field value is different, the previously stored content is updated or replaced by receiving the newly announced content through the NCT. In this embodiment, the content_version field value means a series number representing a release version but may actually represent published (released) time directly. At this point, if the content_version field is difficult to represent publish time, a new field may be used to represent the published (released) time.

A content_id field (16 bits) indicates an identifier uniquely identifying the content (or file).

A content_available_start_time field (32 bits) and a content_available_end_time field (32 bits) represent a start time and end time of a FLUTE session transmitting the content.

An ETM_location field (2 bits) describes the existence and location of an extended text message (ETM).

A content_length_in_seconds field (30 bits) represents an actual play time of a corresponding content in sec unit when the content (or file) is an A/V file.

A content_size field (48 bits) represents the size of the content (or file) in byte unit.

A content_delivery_bit_rate field (32 bits) represents a bit rate at which the content (or file) is transmitted, and means a target bit rate. That is, when a service provider or broadcasting station transmits a corresponding content, the content_delivery_bit_rate field displays how wide a bandwidth is to be allocated. Accordingly, if a receiver uses content_size and content_delivery_bit_rate, the minimum time for receiving a corresponding content (or file) is obtained. That is, the time for receiving content is estimated and provided to a user. Also, the minimum receiving time is obtained by calculating (content_size*8)/(content_delivery_bit_rate) and its unit is in sec.

A content_title_length field (8 bits) represents the length of content_title_text( ) in byte unit. If this field is used, the receiver knows how many bytes need to be read to obtain content_title_text ( ) information.

A content_title_text( ) field represents a content title in the format of a multiple string structure.

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-2 private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted. In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT. (table_id: An 8-bit unsigned integer number that indicates the type of table section being defined in Service Map Table (SMT)).

A section_syntax_indicator field (1 bit) is an indicator defining a session format of SMT, and its session format may be a short-form syntax ('0') of MPEG (section_syntax_indicator: This 1-bit field shall be set to '0' to always indicate that this table is derived from the "short" form of the MPEG-2 private section table).

A private_indicator field (1 bit) indicates whether SMT follows a private section (private_indicator: This 1-bit field shall be set to '1').

A section_length field (12 bits) represents the remaining session length of SMT after a corresponding field (section_length: A 12-bit field. It specifies the number of remaining bytes this table section immediately following this field. The value in this field shall not exceed 4093 (0xFFD)).

A table_id_extension field (16 bits) is dependent on a table, and may be a logical part of a table_id field providing a range of the remaining fields (table_id_extension: This is a 16-bit field and is table-dependent. It shall be considered to be logically part of the table_id field providing the scope for the remaining fields).

Here, a table_id_extension field includes an SMT_protocol_version field.

The SMT_protocol_version field (8 bits) shows a protocol version that allows SMT transmitting parameters having a different structure than those defined in a current protocol (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) includes values of '0x00' to '0x3F', as an ID value related to corresponding Ensemble (ensemble_id: This 8-bit unsigned integer field in the range 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame).

A version_number field (5 bits) represents the version number of SMT. A current_next_indicator field (1 bit) indicates whether a transmitted SMT table session is applicable currently (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) represents a current SMT session number (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents the last session number constituting an SMT table.

(last_section_number: This 8-bit field shall give the number of the last section (i.e., the section with the highest section_number) of the Service Signaling table of which this section is a part).

A num_services field (8 bits) indicates the number of services in an SMT session. (num_services: This 8 bit field specifies the number of services in this SMT section). At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section). The service_id of a service shall not change throughout the life of the service. To avoid confusion, it is recommended that if a service is terminated, then the service_id for the service should not be used for another service until after a suitable interval of time has elapsed. Here, if the service is NRT service, the service_id may identify the NRT service.

A Multi_ensemble_service field (2 bits) identifies whether a corresponding service is transmitted through at least one Ensemble.

Additionally, the corresponding field identifies whether service is rendered as a portion of the service transmitted through a corresponding Ensemble. That is, if the service is NRT service, the filed identifies whether NRT service is transmitted through at least one Ensemble (multi_ensemble_service: A two-bit enumerated field that shall identify whether the Service is carried across more than one Ensemble. Also, this field shall identify whether or not the Service can be rendered only with the portion of Service carried through this Ensemble).

A service_status field (2 bits) identifies a state of a corresponding service. Here, MSB indicates whether a corresponding service is active (1) or inactive (0), and LSB indicates whether a corresponding service is hidden (1) or not (0). Here, when the service is NRT service, MSB of the service_status field indicates whether a corresponding NRT service is active (1) or inactive (0), and LSB indicates whether a corresponding NRT service is hidden (1) or not (0).

A SP_indicator field (1 bit) represents whether service protection of a corresponding service is set. If a SP_indicator field value is 1, service protection is applied to components required for providing meaningful presentation of a corresponding service.

A short_service_name_length field (3 bits) represents the length of a short service name in a short_service_name field in byte unit.

A short_service_name field represents a short name of a corresponding service (short_service_name: The short name of the Service, each character of which shall be encoded per UTF-8[29]. When there is an odd number of bytes in the short name, the second byte of the last of the byte pair per the pair count indicated by the short_service_name_length field shall contain 0x00). For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

A num_services field (5 bits) indicates the number of IP stream components in this service.

IP_version_flag field (1 bit), when set to '0', shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1 bit) shall indicate, when set, that a source IP address value for this Service is present to indicate a source specific multicast.

When a service_destination_IP_address_flag field (1 bit) is set, it indicates that a corresponding IP stream component is transmitted through IP datagram having a different target IP address than service_destination_IP_address. Accordingly, if the flat is set, a receiving system uses component_destination_IP_address as destination_IP_address, and disregards a service_destination_IP_address field in a num_channels loop (service_destination_IP_address_flag: A 1-bit Boolean flag that indicates, when set to '1', that a service_destination_IP_address value is present, to serve as the default IP address for the components of this Service).

In relation to the source_IP_address field (32 or 128 bits), if source_IP_address_flag is set with 1, interpretation is required, but if not set with 0, no interpretation is required.

When the source_IP_address_flag field is set with '1' and the IP_version_flag field is set with '0', this field indicates a 32 but IPv4 address representing a source of a corresponding circuit channel. If the IP_version_flag field is set with '1', this field indicates a 32 bit IPv6 address representing a source of a corresponding virtual channel (source_IP_address: This field shall be present if the source_IP_address_flag is set to '1' and shall not be present if the source_IP_address_flag is set to '0'. If present, this field shall contain the source IP address of all the IP datagram carrying the components of this Service. The conditional use of the 128 bit-long address version of this field is to facilitate possible use of IPv6 in the future, although use of IPv6 is not currently defined).

If the service is NRT service, the Source_IP_address field becomes a source_IP_address of the same server transmitting all channels of the FLUTE session.

In relation to the service_destination_IP_address field (32 or 128 bits), if service_destination_IP_address_flag is set with 1, interpretation is required, but if set with 0, no interpretation is required. When the service_destination_IP_address_flag field is set with '1' and the IP_version_flag field is set with '0', this field indicates a 32 bit destination IPv4 address for a corresponding virtual channel.

When the service_destination_IP_address_flag field is set with '1' and the IP_version_flag field is set with '1', this field indicates a 64 bit destination IPv6 address for a corresponding virtual channel. If the corresponding service_destination_IP_address cannot be interpreted, a component_destination_IP_address field in a num_components loop needs to be interpreted, and a receiving system uses component_destination_IP_address to access an IP stream component (service_destination_IP_address: This field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). If the service is NRT service, the service_destination_IP_Address field is signaled with a destination IP address of a session level of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

An essential_component_indicator field (1 bit), when set to '1', shall indicate that this component is an essential component for the service. Otherwise, this field indicates that this component is an optional component).

A component_destination_IP_address_flag field (1 bit) shall indicate, when set to '1', that the component_destination_IP_address is present for this component.

A port_num_count field (6 bits) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams.

A component_destination_UDP_port_num (16 bits) represents the destination UDP port number for this UDP/IP stream component. For RTP streams, the value of component_estination_UDP_port_num shall be even, and the next higher value shall represent the destination UDP port number of the associated RTCP stream).

A component_destination_IP_address field (32 or 128 bits) shall be present if the component_destination_IP_address_flag is set to '1' and shall not be present if the component_destination_IP_address_flag is set to '0'. When this field is present, the destination address of the IP datagram carrying this component of the M/H Service shall match the address in this field. When this field is not present, the destination address of the IP datagram carrying this component shall match the address in the M/H_service_destination_IP_address field. The conditional use of the 128 bit-long address version of this field is to facilitate possible use of IPv6 in the future, although use of IPv6 is not currently defined.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of component_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute. An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOI field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with 'true' and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
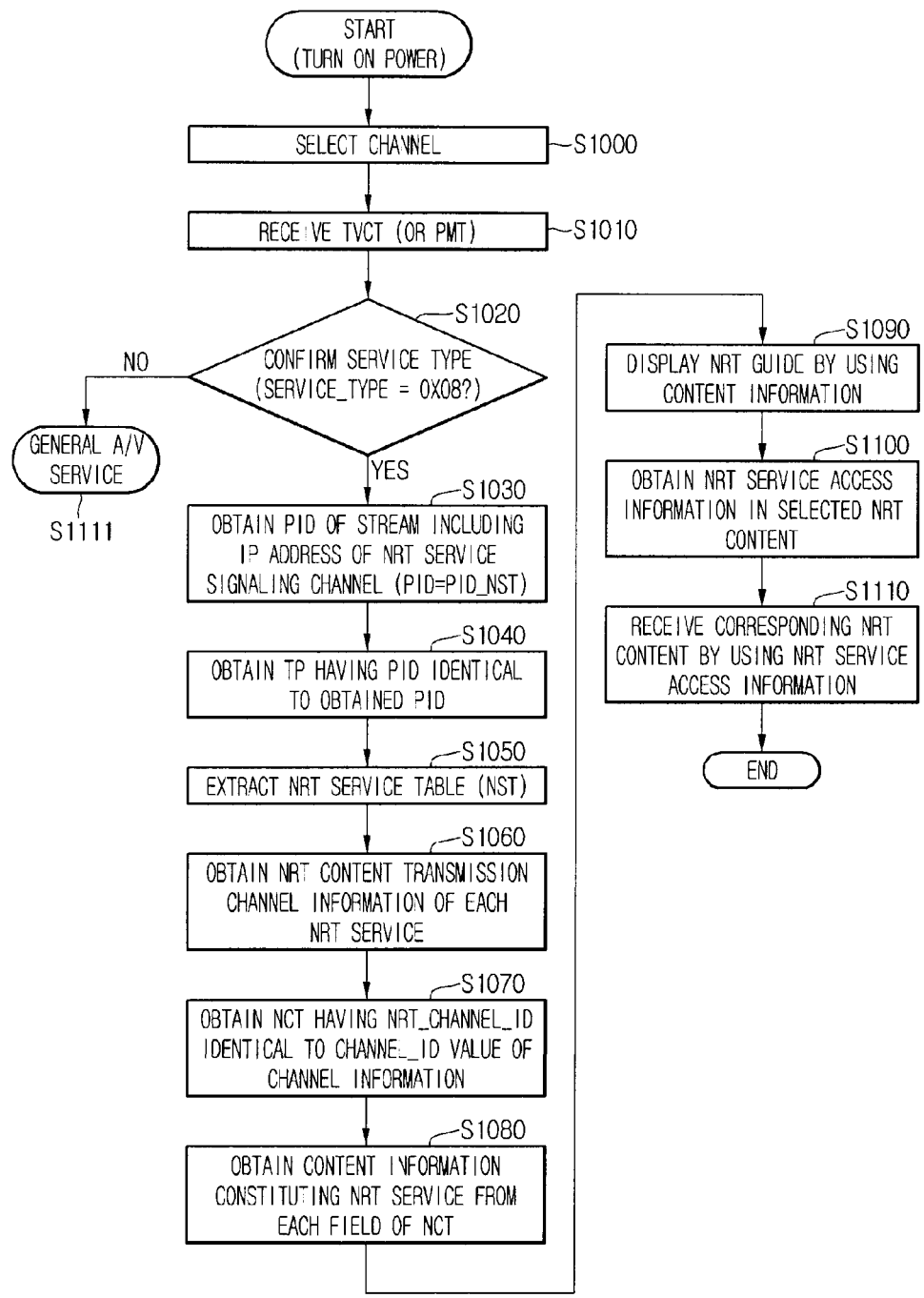
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S1111.

Moreover, if it is determined that there is NRT service, since a corresponding virtual channel transmits NRT service, PID(PID=PID_NST) matching to a specific PID(PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delivery_bit_rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information having the selected NRT content from NST in operation S1100. The NRT service access information may include channel information or IP address information for receiving NRT service data, for example.

Moreover, the receiver receives a corresponding NRT content in operation S1110 by using the obtained NRT service access information after accessing a channel or server for transmitting NRT service, and performs a proper operation according to the NRT content.

Figure 22:
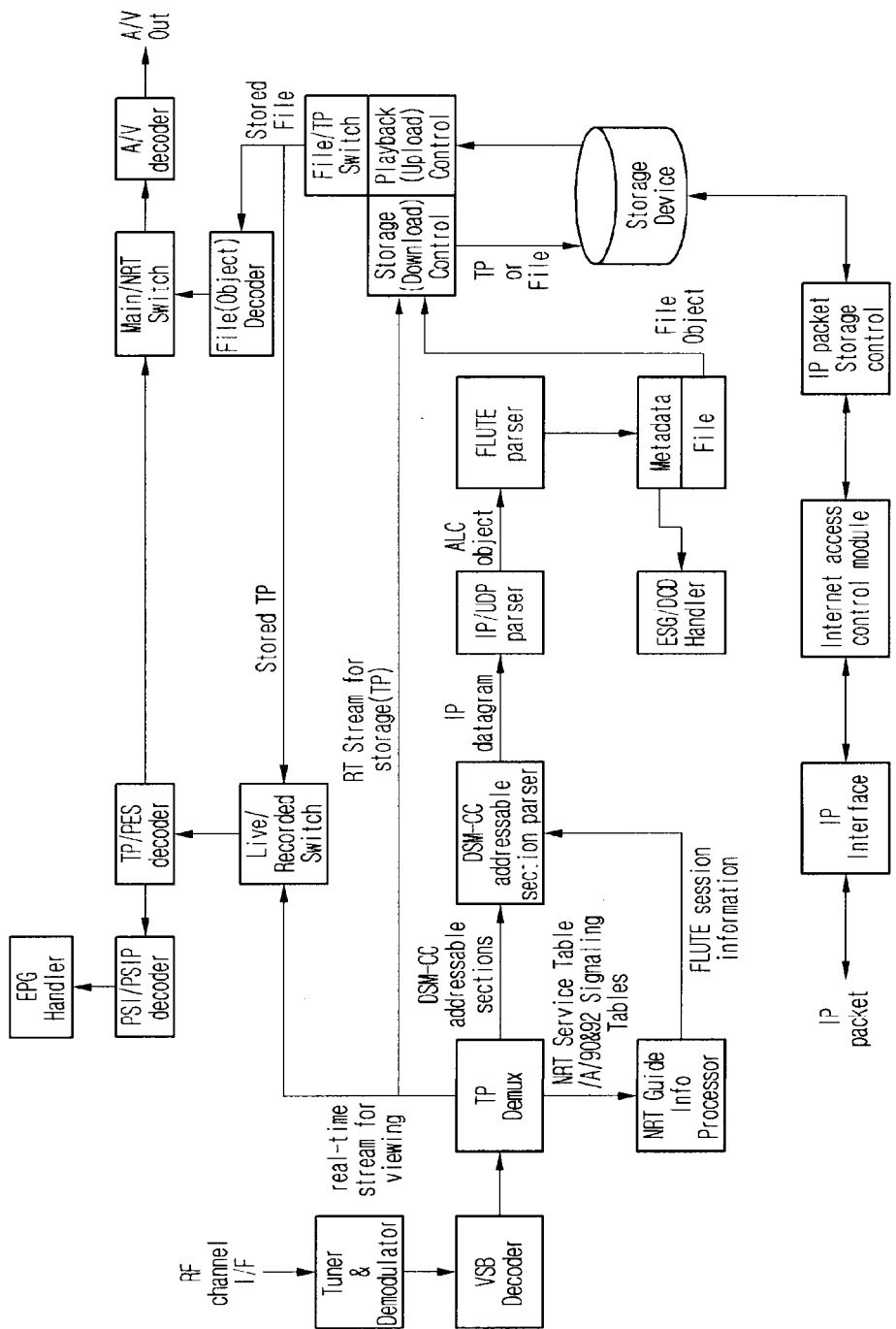
FIGS. 22 and 23 are views illustrating a receiving system receiving, storing, and playing an NRT content for NRT service according to another embodiment.
Figure 23:
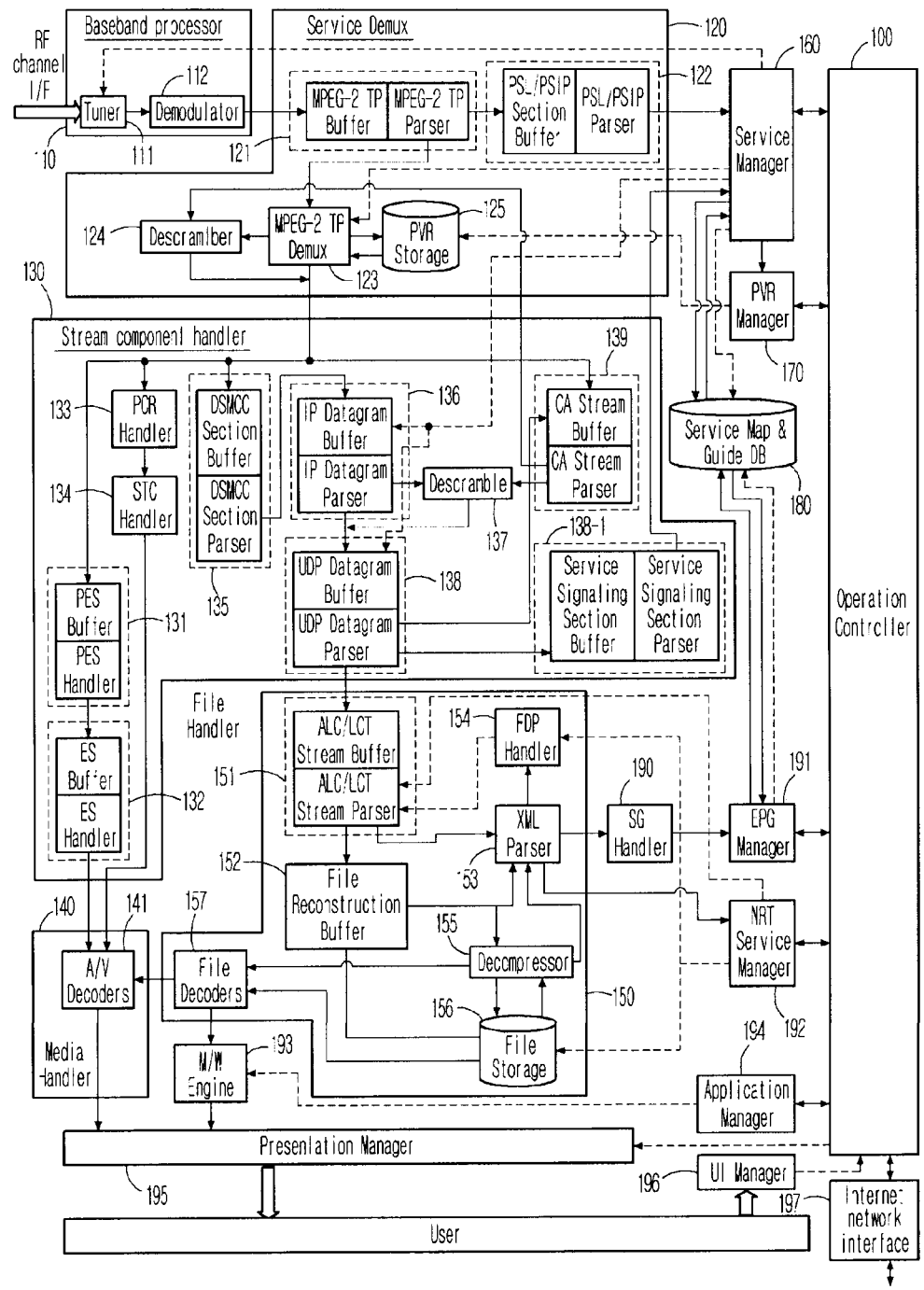

FIGS. 22 and 23 are views illustrating a receiving system receiving, storing, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily storing an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily storing a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be stored in the first storage unit 180. Table information such as VCT, PAT, PMT, and DST are stored in the first storage unit through the above processes. The service manager 160 stores the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135. Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 stores an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., storing) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and stores it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily storing an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily storing a TS packet outputted from the MPEG-2 TP handler or service protection data restored and outputted from a UDP datagram handler 138, restores information (for example, control words used for scramble) necessary for descramble from the stored TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily storing a TS packet outputted from the demultiplexer 123, restores an addressable section in the payload of the TS packet. After restoring IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, stored in the first storage unit 180. The service manager 160 stores the extracted information from the NST in the first storage unit 180 in a service map and guide data format. As another example, the NRT service manager 182 may serve as the service manager 160. That is, the parsed information from the NST is collected by the NRT service manager 192, and then, stored in the first storage unit 180.

The ALC/LCT stream hander 151 includes an ALC/LCT stream buffer and an ALC/LCT stream parser, and after buffering data having an ALC/LCT structure outputted from the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily stored in the file reconstruction buffer 152, it is outputted to the file decoder 157 or stored in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium storing a file such as NRT service data, may be shared with the second storage unit 125, or may be separately used.

Figure 24:
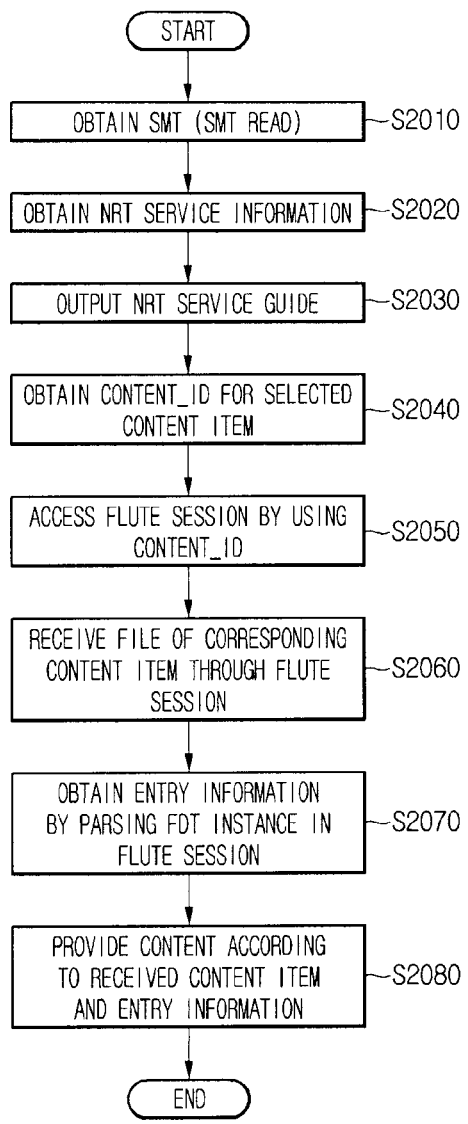
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and storing it in a receiver, a broadcasting station may designate a content item of the corresponding NRT service, which is executed at the timing of when a specific real-time broadcasting is transmitted or the NRT service is displayed. According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on triggering the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver. Additionally, if the action information includes the extension command of the target TDO, a trigger may notify the receiver that the target TDO would extend. Additionally, if the action information includes the termination command of the target TDO, a trigger may notify the receiver that the target TDO would terminate. Thus, the broadcasting station may control a TDO operation in the receiver according to a real-time content through trigger.

Moreover, a trigger time may mean a time designated for performing (trigging) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time. FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with 0XTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself. For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

FIG. 26 is a view illustrating a PES structure according to a synchronized data stream method including a trigger according to an embodiment.

As shown in FIG. 26, PES of the synchronized data stream method may include a PES header and PES payload. The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0x22 according to a type.

A sub_stream_id field is an identifier (user private) settable by a user.

A PTS_extention_flag field indicates whether there is a PTS_extention field. If this field value is 1, the PTS_extension field may be in the PES_data_packet field. Additionally, this field may be 0 when there is no PTS_extension field.

An output_data_rate_flag field may be set with 0.

A syncnronized_data_packet_header_length field represents the length of an optical field in the PES packet header. This field may be included If the PTS_extention_flag field is 1, and represents the length including synchroziced_data_privete_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 µs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be trigged at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) are identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_id_description is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (sevice_id). Additionally, content items constituting NRT service may be identified through conent_lengate or a content identifier in NCT or NRT-IT. Accordingly, trigger service may be transmitted like NRT service by extending app_id_byte through DST. For example, app_id_byte may include data combining a service identifier (service id) field of trigger service and a content_linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentType-Descriptor.

A descriptorLenth field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementray_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and target_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
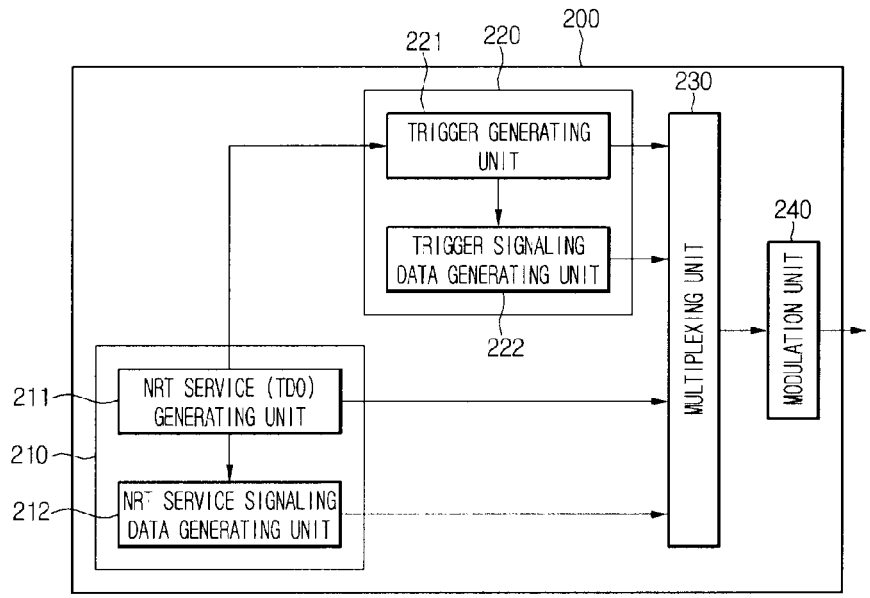
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 22.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
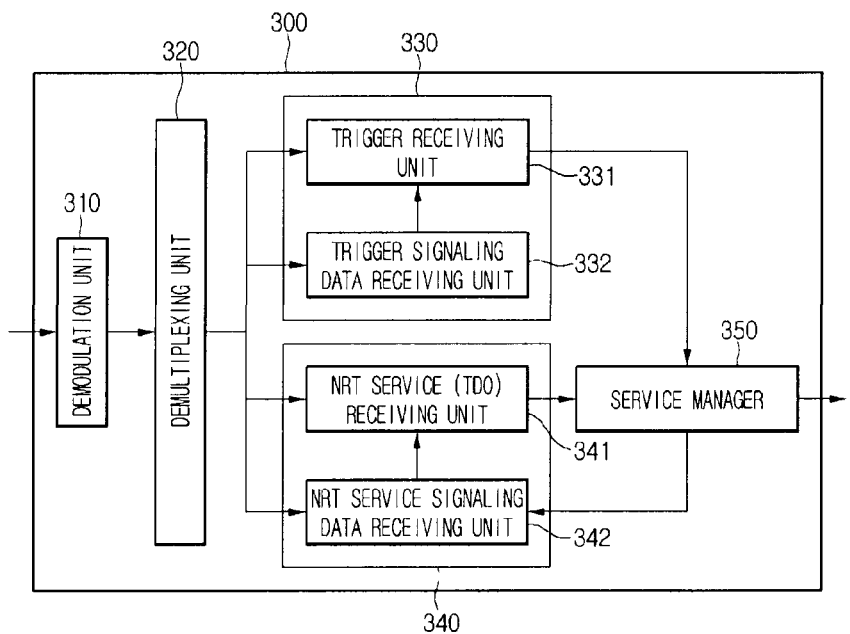
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310, a demultiplexing unit 320, a trigger processing unit 330, an NRT service processing unit 340, and a service manager 350. The trigger processing unit 330 includes a trigger receiving unit 331 and a trigger signaling data receiving unit 332. The NRT service processing unit 340 includes an NRT service (TDO) receiving unit 341 and an NRT service signaling data receiving unit 342.

The demodulation unit 310 receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330 or the NRT service processing unit 340.

The NRT service signaling data receiving unit 342 receives and restores the packetized NRT service signaling data from the multiplexing unit 320 to extract information on NRT service, and then transmits it to the NRT service (TDO) receiving unit 341. The NRT service (TDO) receiving unit 341 receives transmission packets of NRT service from the multiplexing unit 320 by using information on receiving NRT service, and restores it as service data to transmit it to the service manager 350.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350.

The service manager 350 receives at least one of trigger data or NRT service (TDO) data from the trigger processing unit 330 or the NRT processing unit 340. Moreover, the service manager 350 performs and applies a trigger action on a trigger target TDO at the trigger timing, so that a trigger action on TDO is performed.

Figure 35:
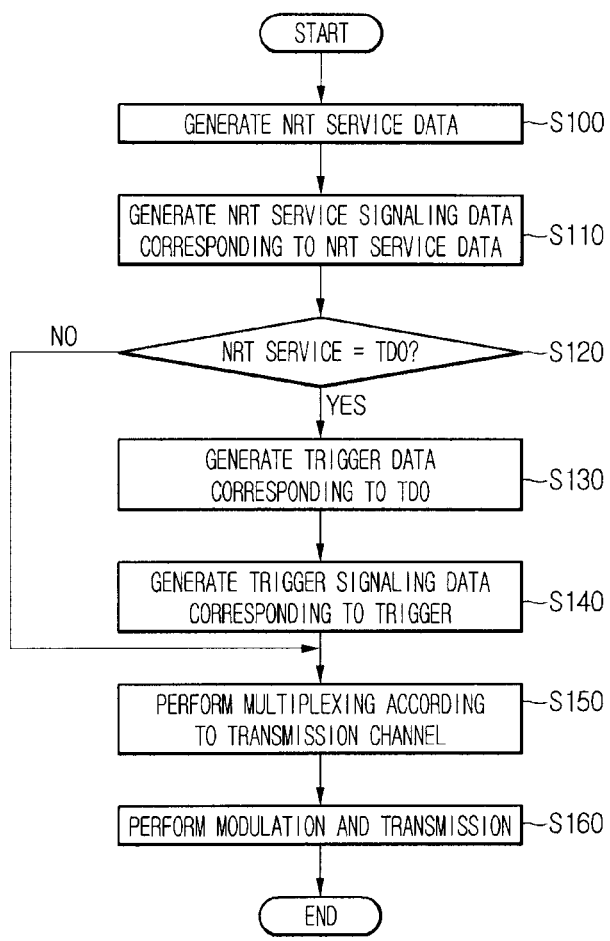
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation S110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
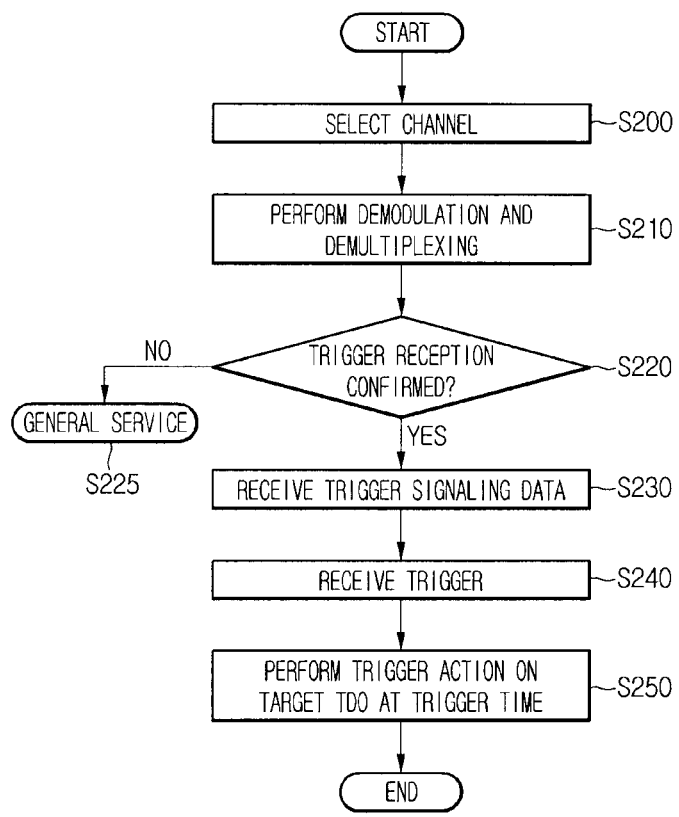
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310 demodulates the received signal from the selected channel, and the demultiplexing unit 320 demultiplexes the demodulated signal by each transmission channel. Also, the NRT service receiving unit 341 and the NRT service signaling data receiving unit 342 receive NRT service data and transmit it to the service manager 350 as described above.

Then, the trigger signaling data receiving unit 332 or the NRT service signaling data receiving unit 342 confirms whether trigger reception is possible in operation s220. The trigger reception confirmation may use one of the above-mentioned methods. That is, the trigger signaling data receiving unit 332 or the NRT service signaling data receiving unit 342 uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation S230.

Later, the trigger receiving unit 331 extracts trigger data from the received transmission packet by using the trigger signaling data, and transmits it to the service manager 350 in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350. Additionally, if the received trigger stream is PES, PTS in the header of PES is extracted as a trigger time, and a target service identifier and trigger action in the payload of PES are extracted, in order to transmit them to the service manager 350.j Moreover, the service manager 350 performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
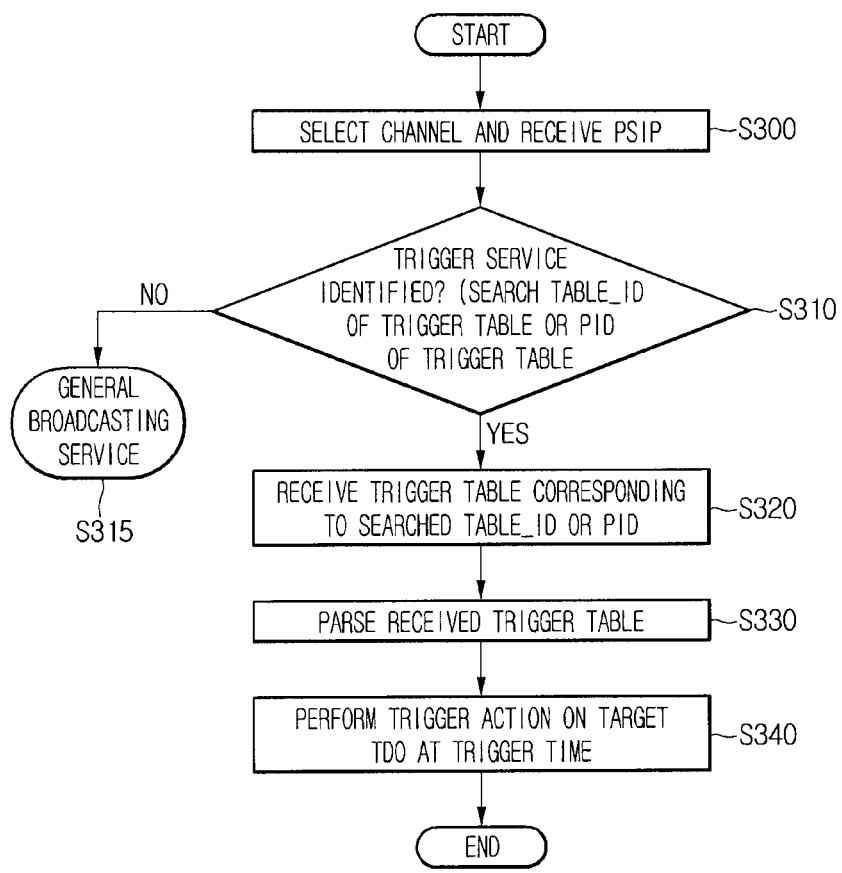
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310 receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350 receives trigger information including trigger time, trigger action, and target TDO identification information parsed in the trigger table, and performs a corresponding trigger action on a corresponding TDO at the corresponding trigger timing in operation S340.

Figure 38:
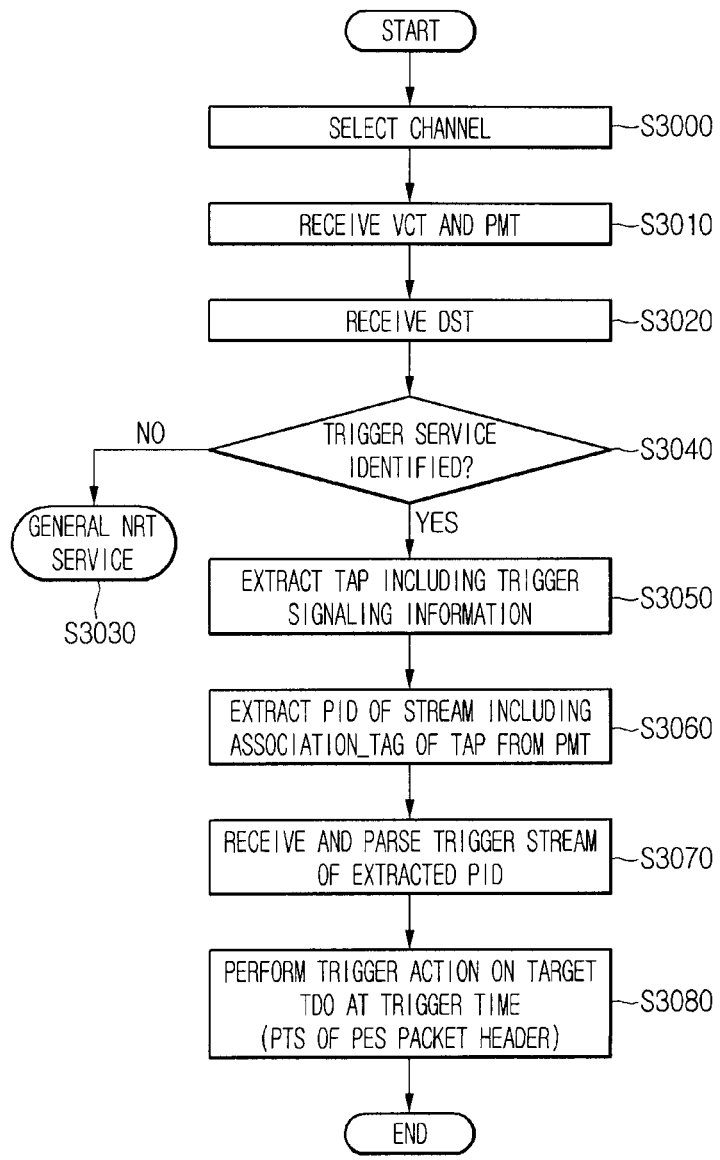
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S3010. Then, the PSI/PSIP section handler or the trigger signaling data receiving unit 332 or the NRT service signaling data receiving unit 342 parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342 or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350.

Also, the trigger signaling data receiving unit 342 identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association_tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350 performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
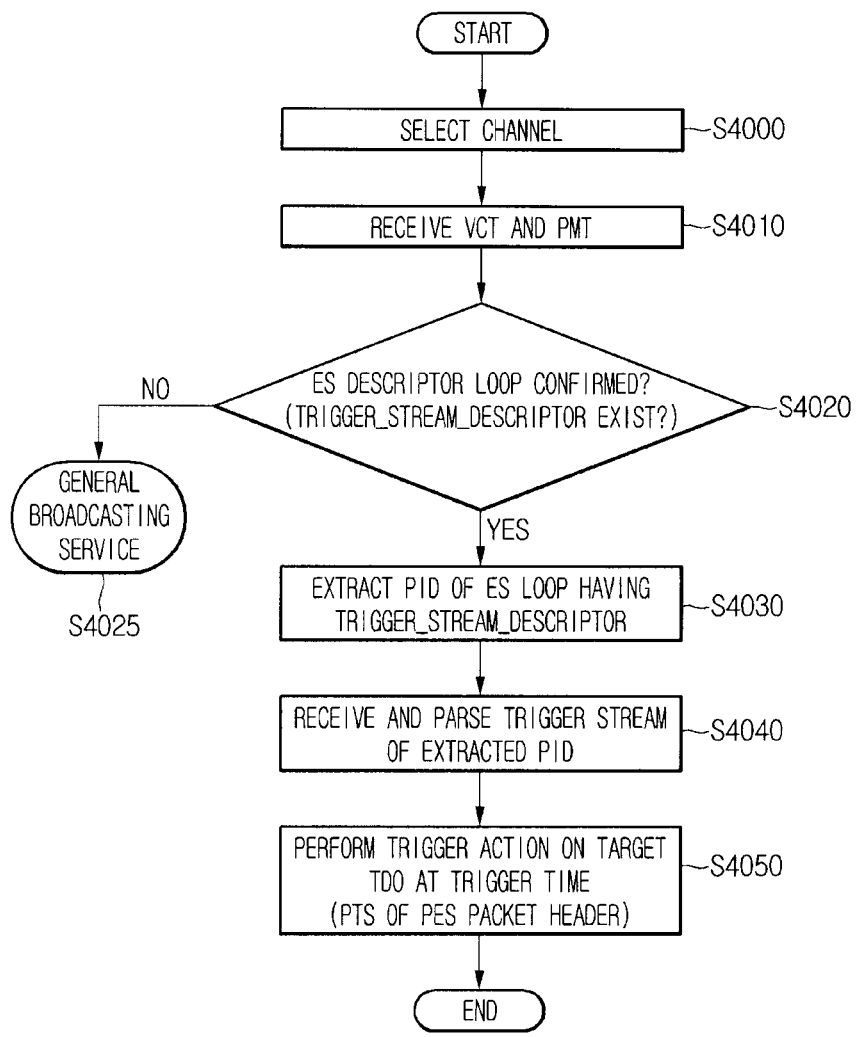
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310 and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350 performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
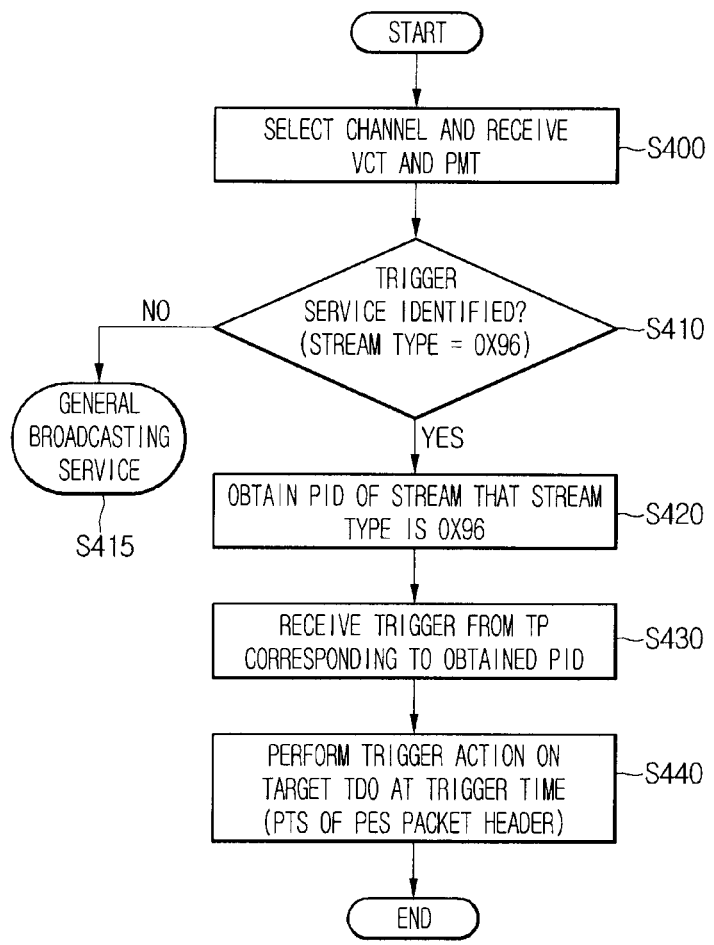
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310 and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350 performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
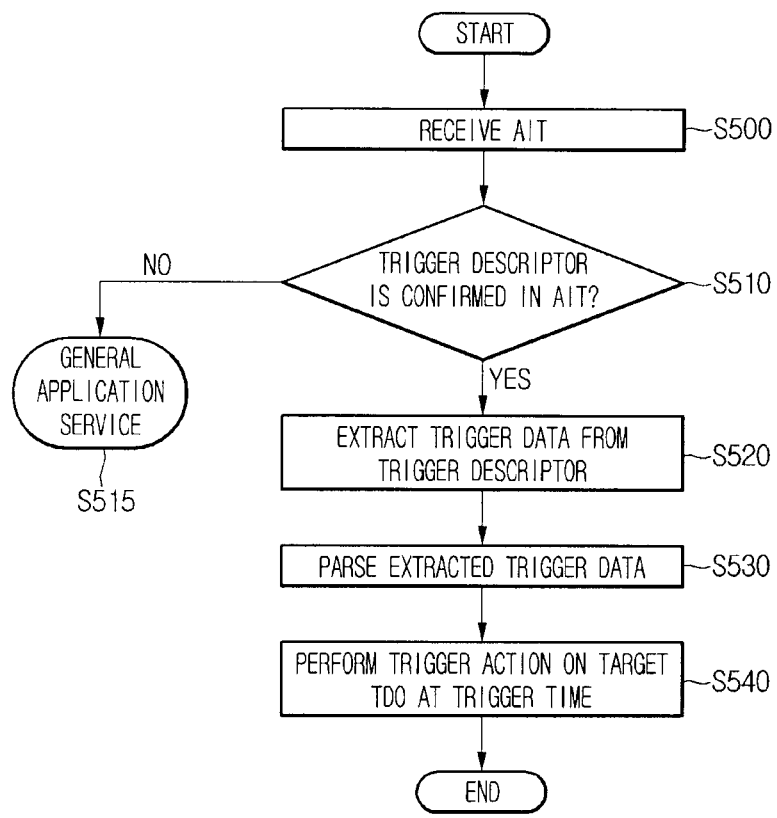
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310 and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350 in operation S530.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 42:
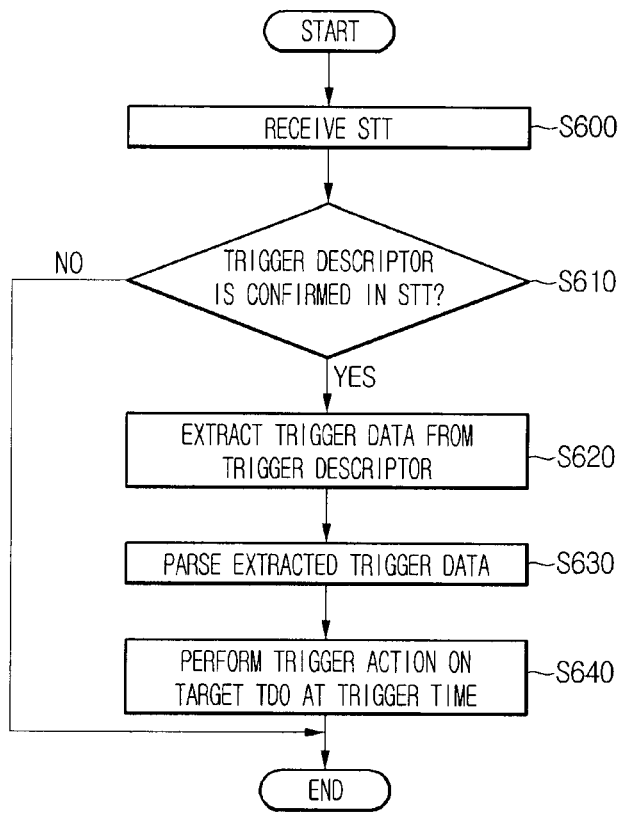
FIG. 42 is a flowchart illustrating an operation of a receiver when a trigger is transmitted using STT according to an embodiment.

FIG. 42 is a flowchart illustrating an operation of a receiver when a trigger is transmitted using STT according to an embodiment.

The trigger signaling data receiving unit 332 receives STT by using the demodulation unit 310 and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350 in operation S630.

Then, the service manager 350 performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Trigger receiving and transmitting methods according to the present invention may be stored in the computer readable recording medium that includes read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains).

According to an embodiment, a content downloaded through a non-real time service is linked with a real-time broadcasting service.

Additionally, according to an embodiment, a non-real time service is linked with a real-time broadcasting service without interfering with an existing receiver.

Moreover, according to an embodiment, broadcasting service is provided at the accurate timing.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for a broadcast receiving device to receive a broadcast, comprising:
    receiving a broadcast stream including media including audio or video;
    receiving a trigger including information representing an identifier for identifying a triggered declarative object (TDO), and information representing a trigger time;
    receiving information representing a trigger action;
    extracting the information representing the identifier and, the information representing the trigger time; and
    performing the trigger action in the trigger time for the TDO identified by the identifier.

2. The method of claim 1, wherein the broadcast stream further includes trigger signaling information,
    wherein receiving the trigger comprises:
        receiving the trigger based on the trigger signaling information.

3. The method of claim 2, wherein the trigger signaling information includes an internet protocol (IP) address,
    wherein receiving the trigger based on the trigger signaling information comprises:
        receiving the trigger through the IP address.

4. The method of claim 1, further comprising:
    downloading the TDO from a non-real time (NRT) service.

5. The method of claim 4, wherein downloading the TDO from the NRT service comprises:
    obtaining, from an NRT service table (NST), NRT service access information which the TDO belongs to, and
    downloading the TDO from an NRT service by using the NRT service access information.

6. The method of claim 5, wherein the NRT service access information includes channel information or IP address information for downloading the TDO.

7. The method of claim 1, wherein receiving the trigger comprises:
    receiving a first packetized stream including the trigger,
    wherein extracting the information representing the identifier and the information representing the trigger time comprises:
        extracting, as the information representing the trigger time, a presentation time stamp (PTS) value from a header of the first packetized stream, and
        extracting the information representing the identifier a payload of the first packetized stream.

8. The method of claim 7, wherein the broadcast stream includes a second packetized stream including the media,
    wherein the PTS value of the first packetized stream is synchronized with a PTS value of the second packetized stream.

9. The method of claim 7, wherein receiving the first packetized stream comprises:
    receiving a program map table,
    obtaining a packet identifier for the first packetized stream from the program map table, and
    receiving the first packetized stream based on the packet identifier,
    wherein obtaining the packet identifier comprises:
        obtaining the packet identifier from the program map table based on a trigger stream descriptor,
        wherein the trigger stream descriptor comprises at least one of a descriptor tag having a predefined value, a descriptor length, a number of target services and a target service identifier.

10. An apparatus for receiving a broadcast service, comprising:
    a receiving unit for receiving a broadcast stream including media including audio or video, and receiving a trigger including an identifier for identifying a triggered declarative object (TDO) and a trigger time and receiving information representing a trigger action;

a trigger processing unit for extracting information representing the identifier, information representing the trigger time the trigger; and a service manager for performing the trigger action in the trigger time for the TDO identified by the identifier.

11. The apparatus of claim 10, wherein the broadcast stream further includes trigger signaling information,
wherein the receiving unit receives the trigger based on the trigger signaling information.

12. The apparatus of claim 11, wherein the trigger signaling information includes an internet protocol (IP) address,
wherein the receiving unit receives the trigger through the IP address.

13. A method for transmitting a broadcast, comprising:
setting a trigger action and a trigger time for a triggered declarative object (TDO);
inserting, into a trigger, information representing an identifier for identifying the TDO and information representing the trigger time;
transmitting a broadcast stream including media including audio or video; and
transmitting the trigger which triggers performing the trigger action in the trigger time for the TDO identified by the identifier.

14. The method of claim 13, wherein the broadcast stream further includes trigger signaling information which is used for a broadcast receiver to receive the trigger.

15. The method of claim 14, wherein the trigger signaling information includes an internet protocol (IP) address which is used for the broadcast receiver to receive the trigger.

* * * * *